(12) United States Patent
Bonne et al.

(10) Patent No.: US 11,464,099 B2
(45) Date of Patent: Oct. 4, 2022

(54) UNIVERSAL ASYNCHRONOUS RECEIVER/TRANSMITTER INTERFACE FOR LIGHT EMITTING DIODE SYSTEM

(71) Applicant: Lumileds LLC, San Jose, CA (US)

(72) Inventors: Ronald Johannes Bonne, Plainfield, IL (US); Zhihua Song, Palo Alto, CA (US)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 17/168,391

(22) Filed: Feb. 5, 2021

(65) Prior Publication Data

US 2021/0251066 A1    Aug. 12, 2021

Related U.S. Application Data

(60) Provisional application No. 63/040,835, filed on Jun. 18, 2020, provisional application No. 62/970,975, filed on Feb. 6, 2020.

(51) Int. Cl.
*H05B 47/18* (2020.01)
*G09G 3/32* (2016.01)
(Continued)

(52) U.S. Cl.
CPC ............ *H05B 47/18* (2020.01); *G09G 3/32* (2013.01); *H05B 45/10* (2020.01); *H04B 10/116* (2013.01)

(58) Field of Classification Search
CPC ...... G09G 3/32; G09G 5/006; G09G 2360/18; G09G 2310/08; G09G 3/2096; G09G 2320/0626; G09G 2340/0435; G09G 3/2014; G09G 2330/02; G09G 3/20; G09G 3/2003; G09G 2310/0291; G09G 2320/0247; G09G 2320/0276; G09G 2320/0673; G09G 2330/022;
(Continued)

(56) References Cited

U.S. PATENT DOCUMENTS 10,628,915 B1 *   4/2020  Lui .......................... G06T 1/60
2003/0222998 A1 * 12/2003  Yamauchi .............. H04N 19/42
                                                    348/262
(Continued)

OTHER PUBLICATIONS

Partial European Search Report issued in Application No. EP 20 17 5424 dated Oct. 10, 2020; 17 pages.
(Continued)

*Primary Examiner* — Monica C King
(74) *Attorney, Agent, or Firm* — Schwegman Lundberg & Woessner, P.A.

(57) ABSTRACT

A LED controller for an LED pixel array includes a serial interface to an external data bus, along with an address generator connected to the serial interface and the LED pixel array. An image frame buffer is connected to the interface to receive image data and further connected to the address generator to receive an image frame buffer address. A command and control module is connected to the serial interface and configured to modify image frame buffer output signals. A calibration data storage module is connected to the command and control module to store calibration data related to pixel voltage response in the LED pixel array and enable modification of voltage provided by the dynamic power supply at least in part based on the image presented by the LED pixel array.

17 Claims, 20 Drawing Sheets

(51) Int. Cl.
*H05B 45/10* (2020.01)
*H04B 10/116* (2013.01)

(58) Field of Classification Search
CPC ............ G09G 2380/10; G09G 3/2088; G09G
3/2092; G09G 3/3648; G09G 3/3677;
G09G 3/3696; G09G 5/363; G09G
2310/04; G09G 2320/041; G09G
2320/043; G09G 2320/0693; G09G
2370/08; G09G 2370/16; G09G 2370/22;
G09G 3/3611; G09G 2300/026; G09G
2300/0842; G09G 2310/0205; G09G
2310/0289; G09G 2320/0233; G09G
2320/0285; G09G 2330/021; G09G
2330/027; G09G 2330/12; G09G
2340/14; G09G 2360/127; G09G 3/3225;
G09G 3/3233; G09G 3/3413; G09G
3/3655; G09G 5/393; G09G 3/30; G09G
3/36; G09G 2300/0408; G09G
2300/0426; G09G 2300/043; G09G
2300/0439; G09G 2300/0465; G09G
2300/0814; G09G 2300/0857; G09G
2300/0861; G09G 2300/0876; G09G
2310/0202; G09G 2310/0232; G09G
2310/0235; G09G 2310/0259; G09G
2310/0262; G09G 2310/0286; G09G
2310/0297; G09G 2310/066; G09G
2310/067; G09G 2320/0209; G09G
2320/0219; G09G 2320/0257; G09G
2320/04; G09G 2320/045; G09G
2320/06; G09G 2320/0606; G09G
2320/0613; G09G 2320/064; G09G
2320/066; G09G 2320/0666; G09G
2320/08; G09G 2320/10; G09G
2320/103; G09G 2330/00; G09G
2330/025; G09G 2330/026; G09G
2330/028; G09G 2330/08; G09G
2330/10; G09G 2340/02; G09G
2340/0407; G09G 2340/0428; G09G
2340/0457; G09G 2340/16; G09G
2350/00; G09G 2352/00; G09G 2360/04;
G09G 2360/06; G09G 2360/12; G09G
2360/125; G09G 2360/144; G09G
2360/145; G09G 2370/04; G09G
2370/10; G09G 2370/12; G09G 2380/06;
G09G 3/001; G09G 3/003; G09G 3/2011;
G09G 3/2029; G09G 3/2208; G09G
3/3216; G09G 3/325; G09G 3/3433;
G09G 3/3614; G09G 3/3618; G09G
3/3659; G09G 5/005; G09G 5/06; G09G
5/18; G09G 5/366; G09G 5/39; G09G
5/391; G09G 5/395; G09G 5/399; B60Q
2300/42; B60Q 1/143; B60Q 2300/054;
B60Q 1/085; B60Q 2300/112; B60Q
2300/122; B60Q 2300/312; B60Q
2300/45; B60Q 1/1407; B60Q 1/1423;
B60Q 1/18; B60Q 2300/056; B60Q
2300/134; B60Q 2300/142; B60Q
2300/322; B60Q 2300/41; B60Q 1/0023;
B60Q 2300/114; B60Q 2300/116; B60Q
2300/144; B60Q 2300/21; B60Q
2300/314; B60Q 2300/32; B60Q
2300/332; B60Q 2300/3321; B60Q
2300/333; B60Q 2300/334; B60Q
2300/337; B60Q 2400/30; B60Q 1/0017;
B60Q 1/0076; B60Q 1/02; B60Q 1/08;
B60Q 1/1415; B60Q 1/1438; B60Q
1/2603; B60Q 2300/132; B60Q 2300/136;
B60Q 2300/324; B60Q 2300/331; B60Q
2300/336; B60Q 2400/50; B60Q 9/008;
H05B 45/10; H05B 45/20; H05B 47/105;
H05B 47/18; H05B 45/50; H05B 47/125;
H05B 39/047; H05B 45/24; H05B 45/28;
H05B 45/46; H05B 45/54; H05B 45/56;
H05B 45/00; H05B 45/22; H05B 45/325;
H05B 45/38; H05B 45/44; H05B 47/19;
H05B 47/22; H05B 35/00; H05B 45/37;
H05B 45/48; H05B 45/58; H05B 45/375;
H05B 45/395; H05B 45/397; H05B
45/52; H05B 47/11; B60R 11/04; B60R
16/023; B60R 1/00; B60R 1/001; B60R
1/04; B60R 1/12; B60R 2001/1215; B60R
2001/1253; B60R 2011/0026; B60R
21/00; B60R 2300/105; B60R 2300/107;
B60R 2300/205; B60R 2300/207; B60R
2300/30; B60R 2300/301; B60R
2300/302; B60R 2300/303; B60R
2300/804; B60R 2300/8093; F21S
41/141; F21S 41/153; F21S 10/02; F21S
41/16; F21S 41/176; F21S 41/25; F21S
41/321; F21S 41/338; F21S 41/36; F21S
41/43; F21S 41/657; F21S 41/686; F21S
41/692; F21S 45/43; F21S 41/14; G06T
1/20; G06T 3/4023; G06T 2200/00; G06T
2200/28; G06T 2200/32; G06T 1/60;
G06T 2210/52; G06T 5/008; G06T 7/00;
G06T 7/20

See application file for complete search history.

(56) References Cited

U.S. PATENT DOCUMENTS

| | | |
|---|---|---|
| 2003/0231195 A1 | 12/2003 | Ueno et al. |
| 2011/0134133 A1 | 6/2011 | Shigenaga |
| 2012/0036418 A1 | 2/2012 | Morino et al. |
| 2015/0245038 A1* | 8/2015 | Clatanoff ................ G09G 3/36 345/545 |
| 2016/0081028 A1* | 3/2016 | Chang ............... H04W 52/0251 455/566 |
| 2019/0098723 A1* | 3/2019 | Sadwick ................ F21K 9/272 |
| 2020/0084854 A1 | 3/2020 | Bonne et al. |

OTHER PUBLICATIONS

"European Application Serial No. 20175424.9, European Search Report dated Jan. 18, 2021", 16 pgs.

\* cited by examiner

UNIVERSAL ASYNCHRONOUS RECEIVER/TRANSMITTER INTERFACE FOR LIGHT EMITTING DIODE SYSTEM

CROSS REFERENCE TO RELATED APPLICATIONS

This application claims the benefit of and priority to U.S. Provisional Application No. 62/970,975, filed Feb. 6, 2020, and U.S. Provisional Application No. 63/040,835, filed Jun. 18, 2020, the disclosures of which are hereby incorporated by reference herein in their entireties for all purposes.

TECHNICAL FIELD OF THE DISCLOSURE

The present disclosure relates generally to a microcontroller with external data image inputs that is able to support an addressable light emitting diode (LED) pixel array at high speed image refresh speeds.

BACKGROUND

While pixel arrays of LEDs with supporting complementary metal oxide semiconductor (CMOS) circuitry have been used, practical implementations suitable for commercial use can face severe manufacture, power, and data management problems. Individual light intensity of thousands of emitting pixels may need to be controlled at refresh rates of 30-60 Hz. High data refresh rates are needed for many applications, and systems that support a variety of calibration, testing, and control methodologies are needed.

SUMMARY

Herein disclosed is a light emitting diode (LED) system. For example, the LED system may include a controller to be utilized for driving an LED pixel array, where the controller may refresh images to be produced by the LED pixel array at frequencies greater than 30 Hertz (Hz).

In one embodiment, a LED controller for an LED pixel array includes an interface to an external data bus and a connection to a dynamic power supply for providing power to an LED pixel array. An image frame buffer is connected to the interface to receive image data connected to the interface to receive image data and provide it to the LED pixel array. A command and control module is connected to the serial interface and configured to modify image frame buffer output signals. A calibration data storage module is connected to the command and control module to store calibration data related to pixel voltage response in the LED pixel array and enable modification of voltage provided by the dynamic power supply at least in part based on the image presented by the LED pixel array.

In one embodiment, a standby image buffer is connected to the image frame buffer to hold a default image. In another embodiment a pulse width modulator is connected between the image frame buffer and the LED pixel array.

In some embodiments, the image frame buffer can refresh held images at 60 Hz or greater speed. Image refresh data can be provided externally over a serial interface.

In one embodiment, the command and control module is connected to an analog-to-digital converter (ADC) that receives temperature data. The command and control module can be connected to an ADC that receives $V_f$ data. In some embodiments, the command and control module can be connected to a digital-to-analog converter (DAC) that receives $V_{bias}$ data.

The command and control module can be connected to a second interface providing external control signals. In another embodiment, the command and control module includes a bypass line connected to the LED pixel array to allow individual pixel addressing.

In some embodiments, the images in the image buffer can be either partially or differentially refreshed.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION

Figure 1:
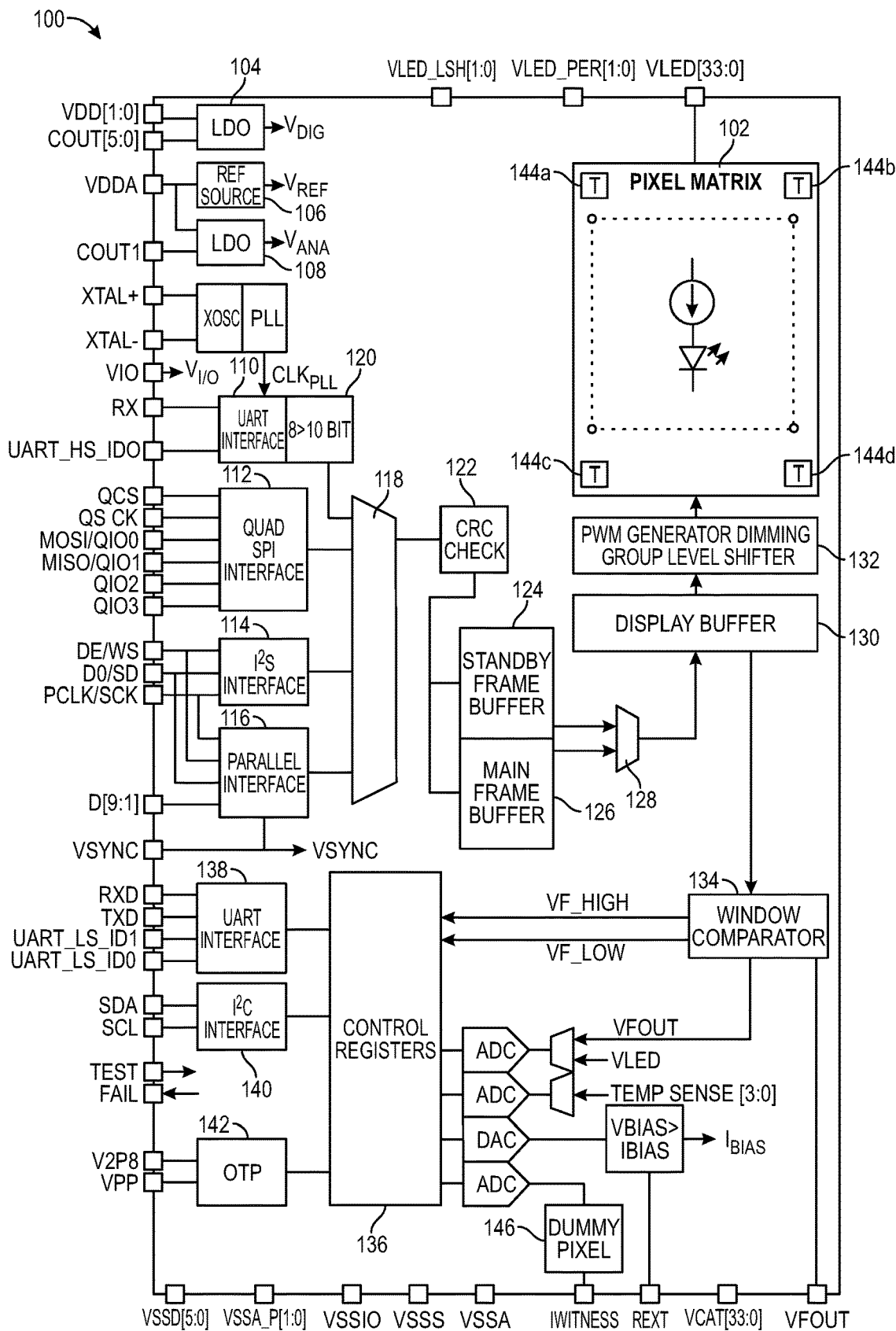
FIG. 1 illustrates a block diagram of an example complementary metal oxide semiconductor (CMOS) backplane that may be utilized for driving a light emitting pixel array, according to various embodiments.

Light emitting pixel arrays may support applications that benefit from fine-grained intensity, spatial, and temporal control of light distribution. This may include, but is not limited to, precise spatial patterning of emitted light from pixel blocks or individual pixels. Depending on the application, emitted light may be spectrally distinct, adaptive over time, and/or environmentally responsive. The light emitting pixel arrays may provide pre-programmed light distribution in various intensity, spatial, or temporal patterns. The emitted light may be based at least in part on received sensor data and may be used for optical wireless communications. Associated electronics and optics may be distinct at a pixel, pixel block, or device level.

Light emitting pixel arrays can be formed from one, two, or three dimensional arrays of LEDs, VCSELS, OLEDs, or other controllable light emitting systems. Light emitting pixel arrays can be formed as pixel arrays on a monolithic substrate, formed by partial or complete segmentation of a substrate, formed using photolithographic, additive, or subtractive processing, or formed through assembly using pick and place or other suitable mechanical placement. Light emitting pixel arrays can be uniformly laid out in a grid pattern, or alternatively can be positioned to define geometric structures, curves, random, or irregular layouts.

In one embodiment, light emitting pixel arrays can be an LED pixel array. LED pixel arrays can include LEDs defined on a monolithic GaN or other semiconductor substrate, segmented LEDs formed on a partially or fully divided semiconductor substrate, or individually or panel assembled groupings of LEDs. LED pixel arrays can include small numbers of LEDs positioned on substrates that are centimeter scale area or greater. In some embodiments, LED pixel arrays can be microLED (µLED) pixel arrays with hundreds, thousands, or millions of light emitting diodes (LEDs) positioned together on centimeter scale area substrates or smaller. In some embodiments, µLEDs can include light emitting diodes sized between 30 microns and 500 microns. In some embodiments each of the light emitting pixels in the light emitting pixel array can be positioned at least 1 millimeter apart to form a sparse LED array. In other embodiments the light emitting pixels are positioned less than 1 millimeter apart and are typically spaced apart by distances ranging from 30 microns to 500 microns. They can be embedded in a solid or a flexible substrate, which can be at least in part transparent. For example, the light emitting pixel arrays can be at least partially embedded in glass, ceramic, or polymeric materials.

A controller can be connected to selectively power subgroups of light emitting pixels in the light emitting pixel arrays to provide different light beam patterns. At least some of the light emitting pixels in the light emitting pixel arrays can be individually controlled through connected electrical traces. In other embodiments, groups or subgroups of light emitting pixel arrays can be controlled together. In some embodiments the plurality of light emitting diodes can have distinct non-white colors. For example, at least four of the plurality of light emitting diodes can be RGBY groupings of light emitting diodes.

Light emitting pixel array luminaires can include light fixtures which can be programmed to project different lighting patterns based on selective pixel activation and intensity control. Such luminaires can deliver multiple controllable beam patterns from a single lighting device using no moving parts. Typically, this is done by adjusting the brightness of individual LEDs in a 1D or 2D array. Optics, whether shared or individual, can optionally direct the light onto specific target areas. In some embodiments the height of the light emitting diodes, their supporting substrate and electrical traces, and associated micro-optics can be less than 5 millimeters.

Light emitting pixel arrays, including LED or µLED pixel arrays, may be used to selectively and adaptively illuminate buildings or areas for improved visual display or to reduce lighting costs. In addition, light emitting pixel arrays may be used to project media facades for decorative motion or video effects. In conjunction with tracking sensors and/or cameras, selective illumination of areas around pedestrians may be possible. Spectrally distinct pixels may be used to adjust the color temperature of lighting, as well as support wavelength specific horticultural illumination.

Street lighting is an important application that may greatly benefit from use of light emitting pixel arrays. A single type of light emitting pixel array may be used to mimic various street light types, allowing, for example, switching between a Type I linear street light and a Type IV semicircular street light by appropriate activation or deactivation of selected pixels. In addition, street lighting costs may be lowered by adjusting light beam intensity or distribution according to environmental conditions or time of use. For example, light intensity and area of distribution may be reduced when pedestrians are not present. If pixels of the light emitting pixel array are spectrally distinct, the color temperature of the light may be adjusted according to respective daylight, twilight, or night conditions.

Light emitting pixel arrays are also well suited for supporting applications requiring direct or projected displays. For example, warning, emergency, or informational signs may all be displayed or projected using light emitting pixel arrays. This allows, for example, color changing or flashing exit signs to be projected. If a light emitting pixel array is composed of a large number of pixels, textual or numerical information may be presented. Directional arrows or similar indicators may also be provided.

Vehicle headlamps are a light emitting pixel array application that requires large pixel numbers and a high data refresh rate. Automotive headlights that actively illuminate only selected sections of a roadway can used to reduce problems associated with glare or dazzling of oncoming drivers. Using infrared cameras as sensors, light emitting pixel arrays activate only those pixels needed to illuminate the roadway, while deactivating pixels that may dazzle pedestrians or drivers of oncoming vehicles. In addition, off-road pedestrians, animals, or signs may be selectively illuminated to improve driver environmental awareness. If pixels of the light emitting pixel array are spectrally distinct, the color temperature of the light may be adjusted according to respective daylight, twilight, or night conditions. Some pixels may be used for optical wireless vehicle to vehicle communication.

Figure 10A:
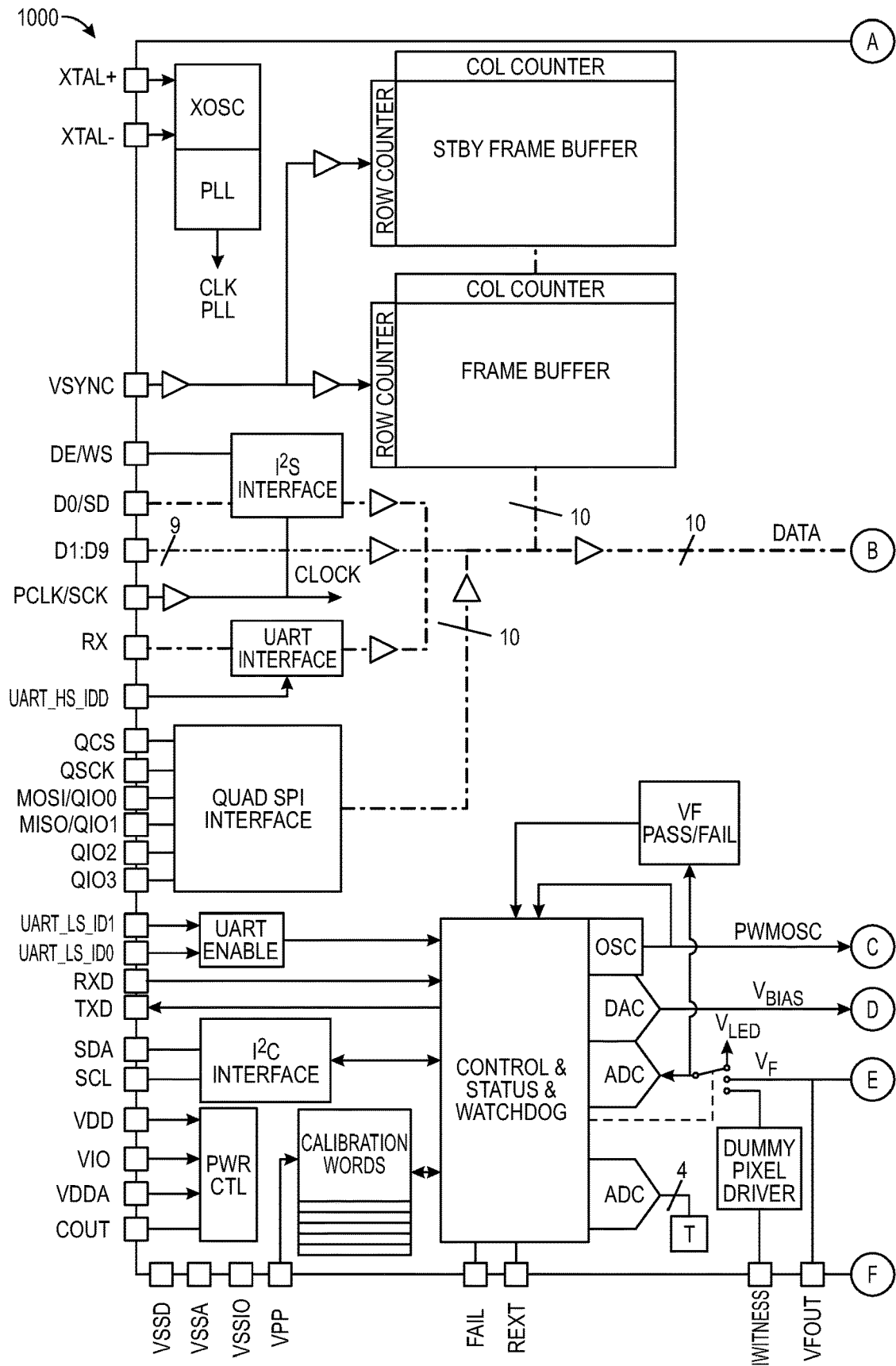
FIG. 10A illustrates a first portion of an alternative microcontroller assembly for an LED pixel array.
Figure 10B:
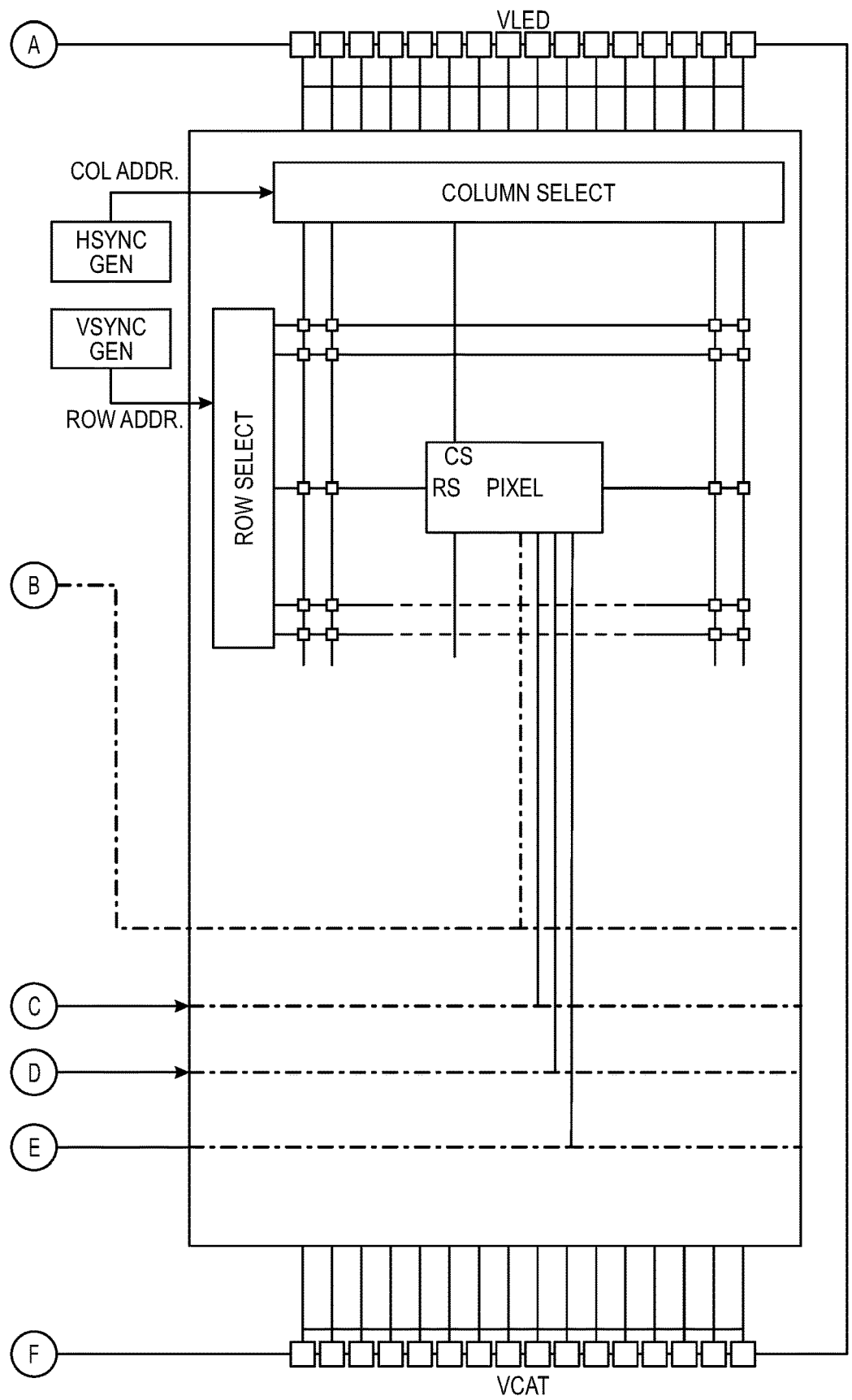
FIG. 10B illustrates a second portion of the alternative microcontroller assembly for the LED pixel array of FIG. 10A.
Figure 11A:
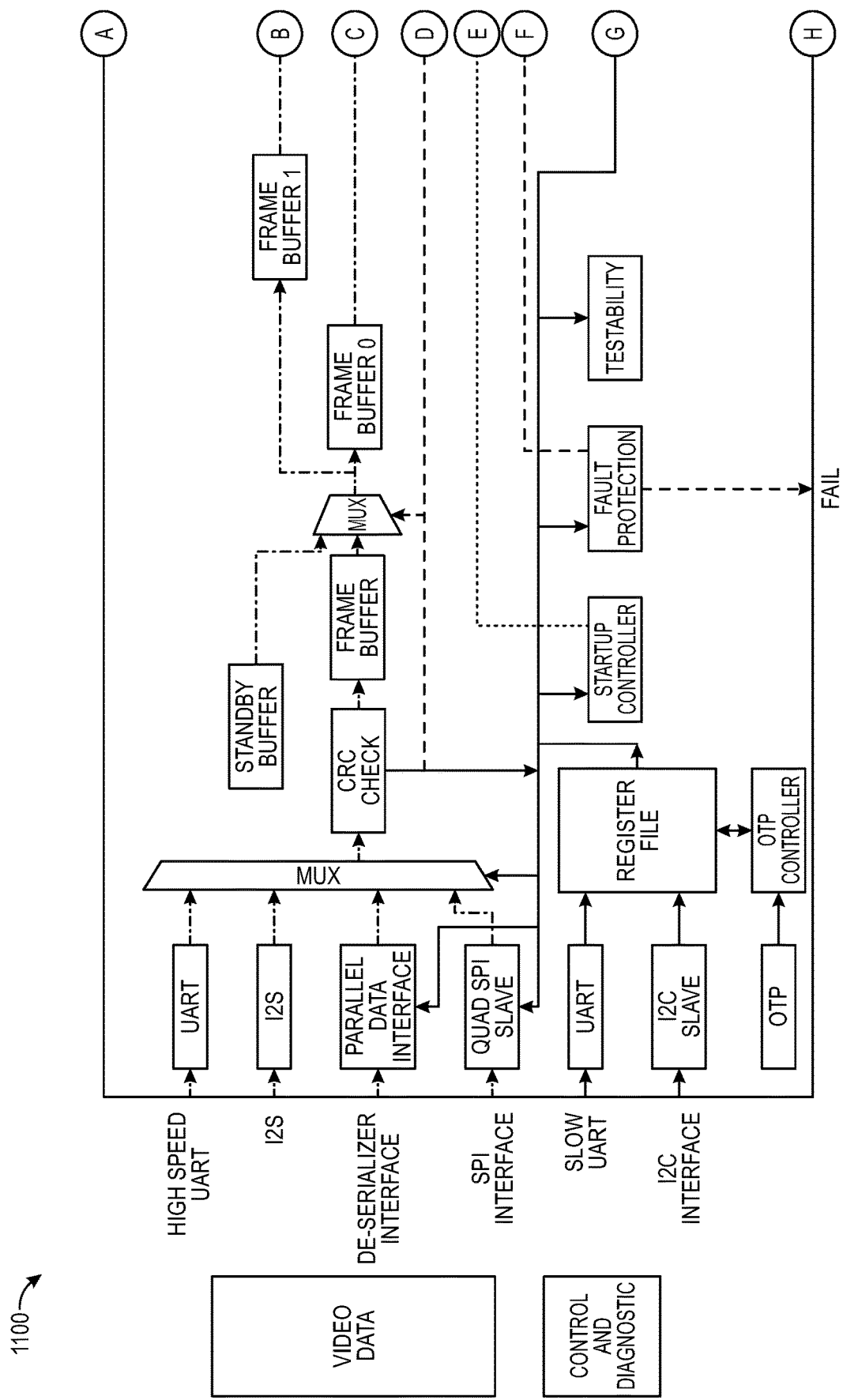
FIG. 11A illustrates a first portion of digital functionality of a microcontroller assembly for an LED pixel array.
Figure 11B:
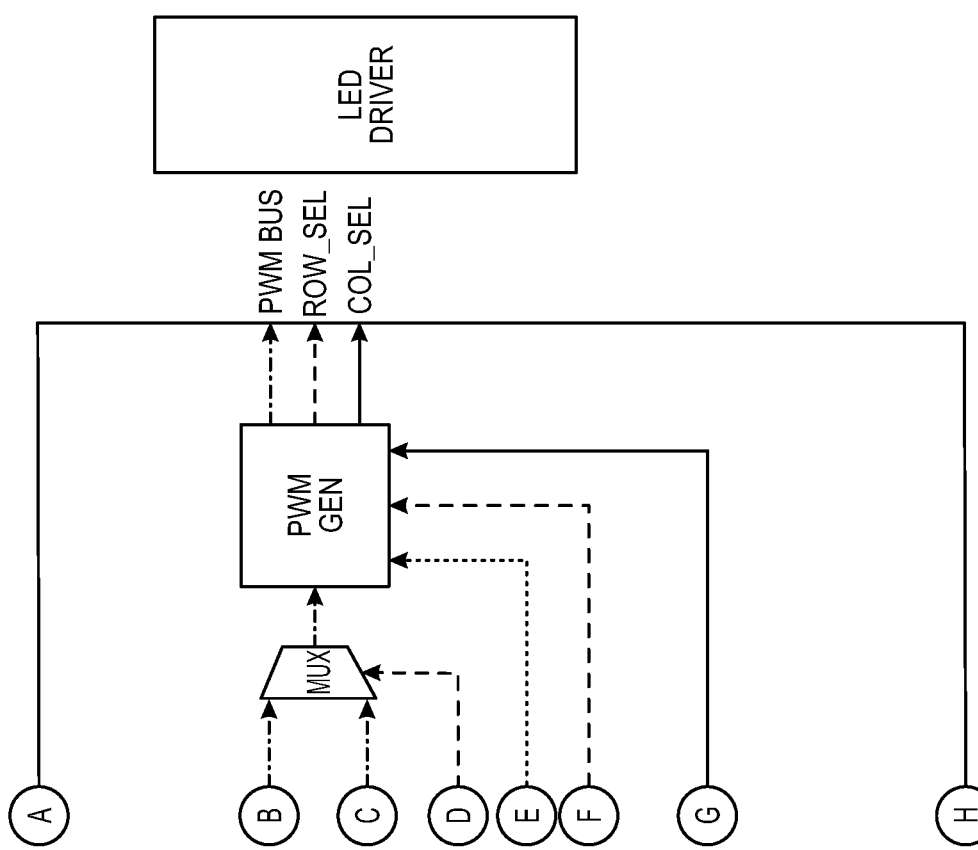
FIG. 11B illustrates a second portion of the digital functionality of the microcontroller assembly for the LED pixel array of FIG. 11A.

Some of the figures described throughout this disclosure have been illustrated with an entirety of a drawing separated between multiple figures to comply with drawing requirements. For example, FIG. 10A and FIG. 10B illustrate a single drawing separated into a first portion and a second portion illustrated in the two figures, and FIG. 11A and FIG. 11B illustrate a single drawing separated into a first portion and a second portion illustrated in the two figures. The figures include off-page references with characters inside, where the off-page reference of a figure should be interpreted to be connected to the off-page reference having the same character within the corresponding other portion of the drawing shown in the related figure.

Throughout the disclosure, elements may be referred to as storing an image or images. It is to be understood that an element being referred to as storing an image or images can mean that the element stores image data representing the image or images rather than storing the image or images themselves. For example, the element may store binary words that represent the image or images in some embodiments, where each of the binary words may provide information for a pixel of an image to cause the pixel to output a certain intensity, color, or other characteristics of the pixel.

FIG. 1 illustrates a block diagram of an example complementary metal oxide semiconductor (CMOS) backplane 100 that may be utilized for driving a light emitting pixel array, according to various embodiments. For example, a light emitting pixel array 102 may be driven by the CMOS backplane 100 in the illustrated embodiment. The light emitting pixel array 102 may comprise a plurality of light emitting diodes (LEDs), where each of the LEDs may form a pixel in an image to be produced by the light emitting pixel array 102. In some embodiments, the LEDs may comprise μLEDs array, where each of the micro LEDs may form a pixel in an image to be produced by the light emitting pixel array 102. The μLEDs may comprise light emitting diodes sized between 30 microns and 500 microns. In some embodiments, the light emitting pixel array 102 may include more than 100 LEDs.

Figure 2:
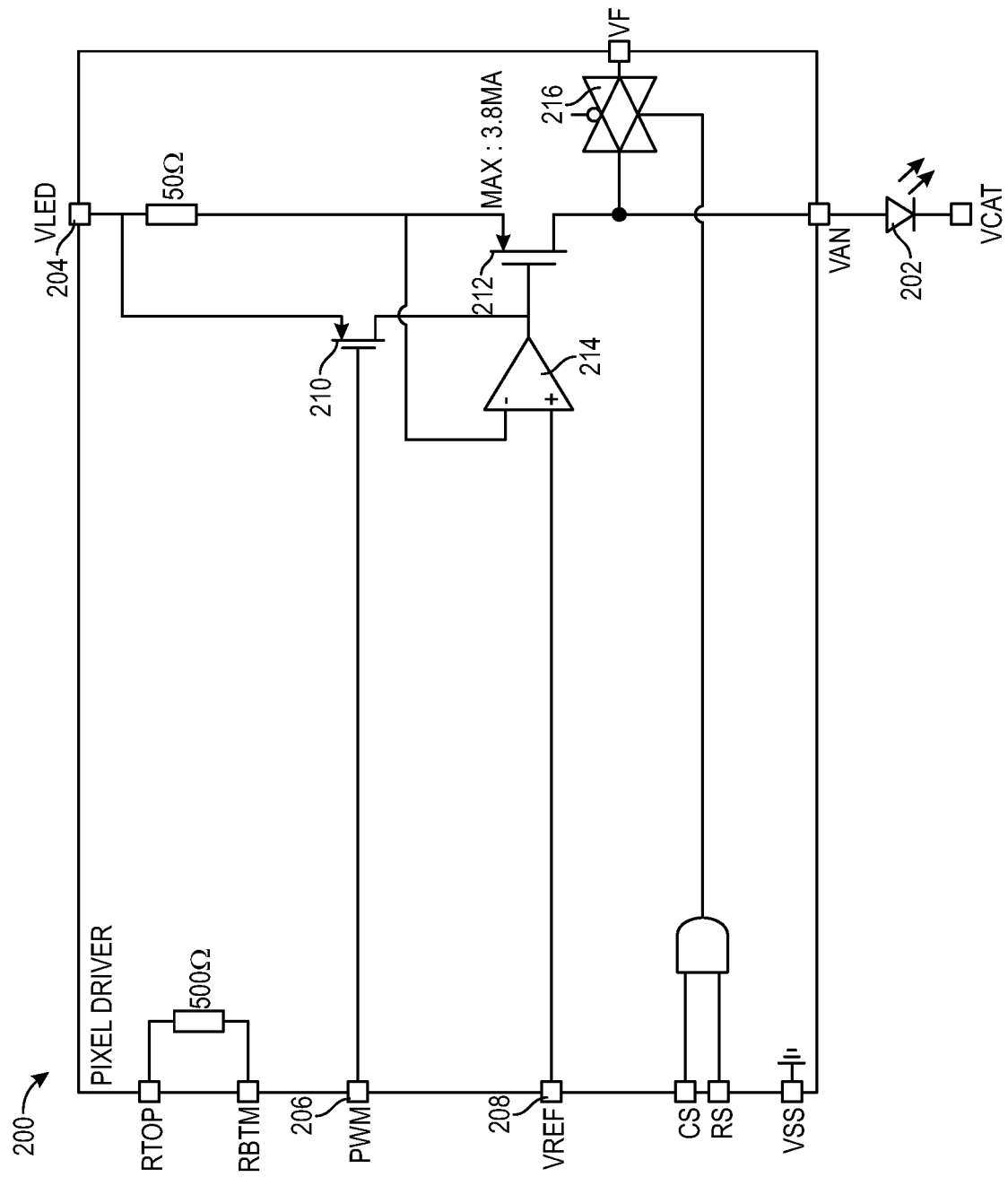
FIG. 2 illustrates an example pixel driver, according to various embodiments.

The light emitting pixel array 102 may further include a plurality of pixel drivers (as described further in relation to FIG. 2). Each of the pixel drivers may correspond to an LED of the light emitting pixel array 102, where each of the pixel drivers can drive (i.e., power) the corresponding LED. Accordingly, the light emitting pixel array 102 may have a one-to-one ratio of pixel drivers to LEDs, where each one of pixel drivers to correspond to a different one of the LEDs than the other pixel drivers. In other embodiments, each pixel driver may drive more than one LED, where the LEDs may be grouped with a single pixel driver driving the LEDs within the group of pixels. Each pixel driver may comprise a constant current driver, where the constant current driver may source a current between 0.6 milliamps (mA) and 3.8 mA in some embodiments. The current provided by the constant current driver may be globally preset in some embodiments. Further, the current provided by the constant current driver may be pulse width modulated with 10 bits resolution and 500 Hz frequency in some embodiments. While the light emitting pixel array 102 is described as including LEDs, it should be understood that the light emitting pixel array 102 may include other light emitting elements in place of or in addition to the LEDs in other embodiments. The light emitting pixel array 102 may be implemented as a pixel module (such as the pixel module 830 (FIG. 8)) in some embodiments.

The CMOS backplane 100 may receive power from one or more power sources to power the CMOS backplane 100. For example, each power source may power different elements within the CMOS backplane 100. In the illustrated embodiments, the CMOS backplane 100 receives inputs from two power sources. Power from the first power source may be received by a low dropout regulator (LDO) 104. The LDO 104 may produce a digital voltage that can be utilized for powering one or more of the elements of the CMOS backplane 100. For example, the LDO 104 may be utilized to power pixels in the light emitting pixel array 102. In some embodiments, the LDO 104 may be implemented in a vehicle headlamp system (such as the vehicle headlamp system 700 (FIG. 7)) as an LED DC/DC (such as the LED DC/DC 712 (FIG. 7)). The first power source may comprise a digital power source in some embodiments. A reference source element 106 may receive power from the second power source. The reference source element 106 may produce a reference voltage that can be utilized as a reference voltage for elements within the CMOS backplane 100. The reference source element 106 may be part of an input filter and protection module (such as the input filter and protection module 710 (FIG. 7)), an LED DC/DC (such as the LED DC/DC 712 (FIG. 7)), a logic LDO (such as the logic LDO 714 (FIG. 7)), and/or an LED power distribution and monitor (such as the LED power distribution and monitor module 810 (FIG. 8)) in some embodiments. An LDO 108 may receive power from the second power source. The LDO 108 may produce an analog voltage that can be utilized for powering one or more of the elements of the CMOS backplane 100. The LDO 108 provide power to a microcontroller (such as the microcontroller 722 (FIG. 7)). The LDO 108 may be implemented as a logic LDO (such as the logic LDO 714 (FIG. 7)) that provides power to the microcontroller.

The CMOS backplane 100 may further have one or more image inputs to input images to be produced by the light emitting pixel array 102. The image inputs may be utilized to input image data into the CMOS backplane 100, where the image data may comprise data representing a video or series of images being provided to the CMOS backplane 100 by an external element. The image data may include a plurality of frames, where each frame represents a single image of the video or series of images being provided to the CMOS backplane 100. Each of the one or more image inputs may support different communication protocols. In the illustrated embodiment, the CMOS backplane 100 has four image inputs, where each image input may include an interface for interfacing with an external element that provides video and/or images to be produced by the light emitting pixel array 102. In particular, the CMOS backplane 100 includes a universal asynchronous receiver/transmitter (UART) interface 110, a serial peripheral interface (SPI) 112, an inter-integrated circuit sound (I²S) interface 114, and a parallel interface 116. Each of the image inputs may be utilized for different situations. For example, the SPI 112 may be utilized for short-range synchronized communication with a local electronic control unit (ECU). The parallel interface 116 may be utilized with serializer/deserializer integrated circuits (ICs) for long-range low-voltage differential signaling (LVDS) type communication with a remote ECU. The I²S interface 114 may be utilized with legacy display controller. The UART interface 110 may be utilized for long-range differential (unshielded twisted pair (UTP)) communication to a remote ECU). The UART interface 110, the SPI 112, the I²S interface 114, and the parallel interface 116 may be implemented within a bus transceiver (such as the bus transceiver 720 (FIG. 7)), a SPI interface (such as the SPI interface 812 (FIG. 8)), or with a portion within the bus transceiver and a portion within the SPI interface.

In some embodiments, the UART interface 110 may receive 8-bit image data, although the CMOS backplane 100 may utilize 10-bit image data. In these embodiments, the CMOS backplane 100 may include 8-bit to 10-bit conversion circuitry 120 to convert the 8-bit image data to 10-bit image data for use by the CMOS backplane 100. The 8-bit to 10-bit conversion circuitry 120 may be implemented within a bus transceiver (such as the bus transceiver 720 (FIG. 7)), within an SPI interface (such as the SPI interface 812 (FIG. 8)), or both. The 8-bit to 10-bit conversion circuitry 120 may utilize a piece-wise linear interpolation curve to translate 8-bit image data to 10-bit image data. The interpolation process may include creating 9 points and 8 segments for interpolation purposes. In some embodiments, the piece-wise linear interpolation curve may be programmable with a customer programmable curve. For example, an interpolation equation may be utilized for converting the 8-bit image data to the 10-bit image data.

Each of the UART interface 110, the SPI 112, the I²S interface 114, and the parallel interface 116 may be coupled to a multiplexer 118. A bus transceiver (such as the bus transceiver 720 (FIG. 7)), an SPI interface (such as the SPI interface 812 (FIG. 8)), or both may include a multiplexer, such as the multiplexer 118. The multiplexer 118 may select one of the UART interface 110, the SPI 112, the I²S interface 114, and the parallel interface 116 as the input and may output image data received from the selected interface on the output of the multiplexer 118. In some embodiments, the multiplexer 118 may select one of the interfaces as a default interface on startup of the CMOS backplane 100. The interface selected by the multiplexer 118 may be modified by an external controller, where a signal from the external controller can indicate which of the interfaces the multiplexer 118 should select to output. In other embodiments, the interface to be selected by the multiplexer 118 may be selected on startup of the CMOS backplane 100 or may be pre-programmed.

The CMOS backplane 100 may further include cyclic redundancy check (CRC) circuitry 122. The CRC circuitry 122 may be coupled to the output of the multiplexer 118 and may receive image data output by the multiplexer 118. In particular, the CRC circuitry 122 may receive the image data provided by the selected interface (either the UART interface 110, the SPI 112, the I²S interface 114, or the parallel interface 116 selected by the multiplexer 118 for output at the time). The CRC circuitry 122 may perform a CRC on the image data received by the CRC circuitry 122 to verify that the image data was not corrupted during transmission. The CRC circuitry 122 may be able to perform the CRC of the image data at a frequency greater than 30 Hz, such that the CRC circuitry 122 can perform CRC on at least 30 frames of the image data per second. In some embodiments, the CRC circuitry 122 can perform the CRC at a frequency of 60 Hz. Depending on the results of the CRC, the CRC circuitry 122 may output the image data. For example, if the CRC passes, the CRC circuitry 122 can output the image data and, if the CRC fails, the CRC circuitry 122 may not output the image data. The CRC format for the CRC performed by the CRC circuitry 122 may be configured at startup. For example, the CRC can be configured to be a 16-bit CRC polynomial format or a 32-bit CRC polynomial format at startup in some embodiments. Further, the CRC circuitry 122 may be configured to use least significant bit (LSB) first or most significant bit (MSB) first for the CRC based on an input to the CMOS backplane 100. Additionally, the CRC circuitry 122 may be configured to have an initial value for a CRC calculation engine of the CRC be all '0' or all '1' based on an input to the CMOS backplane 100. The CRC circuitry 122 may be implemented in an SPI interface (such as the SPI interface 812 (FIG. 8)), a frame buffer (such as the image frame buffer 814 (FIG. 8)), or a logic and control module (such as the logic and control module 820 (FIG. 8)).

The CMOS backplane 100 may further include a standby frame buffer 124 and a frame buffer 126. In some embodiments, the standby frame buffer 124 may be implemented as a standby image buffer (such as the standby image buffer 816 (FIG. 8)) within an active headlamp system (such as the active headlamp system 800 (FIG. 8)) and the frame buffer 126 may be implemented as an image frame buffer (such as the image frame buffer 814 (FIG. 8)) within the active headlamp system. The standby frame buffer 124 and the frame buffer 126 may be coupled to the output of the CRC circuitry 122 and may receive the image data output by the CRC circuitry 122. The CMOS backplane 100 may control which of the standby frame buffer 124 or the frame buffer 126 stores image data output by the CRC circuitry 122 at a time. For example, the standby frame buffer 124 may be configured to store image data representing a default image, which may be referred to as the standby frame buffer 124 storing a default image and the image data stored in the standby frame buffer 124 may be referred to as default image data. The standby frame buffer 124 may be configured to store image data corresponding to a default image when the image data corresponding to the default image is output by the CRC circuitry 122, whereas the frame buffer 126 may be configured not to store image data when the image data corresponding to the default image is being output by the CRC circuitry 122. In some embodiments, the image data corresponding to the default image may be input on startup of the CMOS backplane 100 or may pre-programmed into the standby frame buffer 124. In contrast, the frame buffer 126 may be configured to store image data output by the CRC circuitry 122 that does not correspond to the default image, whereas the standby frame buffer 124 may be configured not to store image data when the image data that does not correspond to the default image is being output by the CRC circuitry 122. In some embodiments, one or more switches or a multiplexer may be provided between the CRC circuitry 122, and the standby frame buffer 124 and the frame buffer 126 such that the image data is only provided to either of the standby frame buffer 124 or the frame buffer 126 that is intended to store the image data. By having the standby frame buffer 124 that stores a default image, the CMOS backplane 100 may compensate for a lack of image data being provided to the CMOS backplane 100 or corruption of image data provided to the CMOS backplane 100 by displaying the default image when other image data is unavailable. Accordingly, the default image may be displayed by the light emitting pixel array 102 when other image data is unavailable rather than the light emitting pixel array 102 not displaying an image or displaying an undesirable image when other image data is unavailable.

The CMOS backplane 100 may further include a multiplexer 128. The multiplexer 128 may be coupled to the output of the standby frame buffer 124 and the output of the frame buffer 126 and may determine which of the image data received from the standby frame buffer 124 and the frame buffer 126 is to be output by the multiplexer 128. In some embodiments, the multiplexer 128 may be configured to select the image data from the standby frame buffer 124 to be output by the multiplexer 128 on startup of the CMOS backplane 100. Further, the multiplexer 128 may be configured to select the image data from standby frame buffer 124 to be output by the multiplexer 128 when there is no image data stored in the frame buffer 126 or the image data stored in the frame buffer 126 is below a threshold amount of image data. When there is image data stored in the frame buffer 126 or the image data stored in the frame buffer 126 exceeds the threshold amount of image data, the multiplexer 128 may configured to select the image data from the frame buffer 126 to be output by the multiplexer 128. The frame buffer 126 may be configured to remove image data from storage when the image data is provided by the frame buffer 126 to the output of the multiplexer 128, whereas the standby frame buffer 124 may retain the image data corresponding to the default image in storage when the image data is provided by the standby frame buffer 124 to the output of the multiplexer 128.

In other embodiments, the standby frame buffer 124 may be coupled to the frame buffer 126 and may provide the image data corresponding to the default image to the frame buffer 126 when there is no image data in the frame buffer 126. In these embodiments, the multiplexer 128 may be omitted and the output of the frame buffer 126 may be directly connected to a display buffer 130 to provide image data to the display buffer 130. For example, the active headlamp system 800 (FIG. 8) is an example of an embodiment where the multiplexer 128 is omitted and the standby frame buffer 124 is coupled to the frame buffer 126.

The CMOS backplane 100 may further include a display buffer 130. The display buffer 130 may be coupled to the output of the multiplexer 128 and may receive the image data output by the multiplexer 128. The display buffer 130 may store the image data output by the multiplexer 128. In some embodiments, the display buffer 130 may be implemented as part of an image frame buffer (such as the image frame buffer 814 (FIG. 8)).

The CMOS backplane 100 may further include pulse width modulation (PWM) generator circuitry 132. The PWM generator circuitry 132 may be coupled to the display buffer 130 and may retrieve image data from the display buffer 130. The PWM generator circuitry 132 may generate one or more PWM signals based on the image data retrieved from the display buffer 130 and provide the generated PWM signals to the light emitting pixel array 102. The PWM signals may drive the operation of the pixels within the light emitting pixel array 102. For example, the PWM signals provided to the light emitting pixel array 102 may cause the pixels (i.e., LEDs) within the light emitting pixel array 102 to turn on in accordance with the PWM signals. The PWM generator circuitry 132 may further generate the PWM signals with time shift. For example, a first portion of the PWM signals may go high (which results in the pixels of the light emitting pixel array 102 turning on) at a first time during one PWM period while a second portion of the PWM signals may go high at a second time during one PWM period. The pixels within the light emitting pixel array 102 may be separated into groups where turn on times (where corresponding PWM signals go high) of each group of pixels may be uniformly distributed throughout with one PWM period. By shifting the turn on times of the pixels, an amount of change at a time due to the current due to the pixels turning on and/or turning off may be lower than if all of the pixels of the light emitting pixel array 102 are turned on at the same time. The lower change in the amount of current can reduce negative electrical effects that can occur due to higher amounts of current change. In some embodiments, the PWM generator circuitry 132 may be implemented as a pulse width modulation module (such as the pulse width modulation module 818 (FIG. 8)) within an active headlamp system (such as the active headlamp system 800 (FIG. 8)).

The CMOS backplane 100 may further include a comparator 134. The comparator 134 may be coupled to the display buffer 130. The comparator 134 may determine whether there are shorts and/or open circuits within the light emitting pixel array 102. For example, the comparator 134 may determine whether any of the LEDs are shorted and/or whether any of the drivers are open within the light emitting pixel array 102. The comparator 134 can compare measured forward voltages of pixels within the light emitting pixel array 102 with an open comparator threshold voltage and/or a short comparator threshold voltage to determine whether any of the LEDs are shorted and/or whether any of the drivers are open within the light emitting pixel array 102. In some embodiments, the comparator 134 may be implemented as part of a logic and control module (such as the logic and control module 820 (FIG. 8)) within an active headlamp system (such as the active headlamp system 800 (FIG. 8)).

The CMOS backplane 100 may further include one or more control registers 136. The control registers 136 may store data for controlling operation of one or more of the elements within the CMOS backplane 100. For example, the control registers 136 may receive data related to settings for the CMOS backplane 100 from external elements and may utilize the data to configure one or more of the elements (such as the CRC circuitry 122, the multiplexer 118, and/or other elements within the CMOS backplane 100) within the CMOS backplane 100 for operation. Further, the control registers 136 can store data output by elements of the CMOS backplane 100 (such as outputs of error detection). In some embodiments, the control registers 136 may comprise 256 read/write registers that allow control of the CMOS backplane 100 and/or read back of status information related to the CMOS backplane 100, as well as allowing diagnostics of the CMOS backplane 100. In some embodiments, the control registers 136 may be implemented as part of a logic and control module (such as the logic and control module 820 (FIG. 8)) within an active headlamp system (such as the active headlamp system 800 (FIG. 8)).

The CMOS backplane 100 may further include one or more interfaces for communication with external elements. In the illustrated embodiment, the CMOS backplane 100 may include a UART interface 138 and an I$^2$C interface 140 for communicating with external elements. The UART interface 138 and the I$^2$C interface 140 may be coupled with the control registers 136 and may provide for communication between the external elements and the control registers 136. The interfaces can allow an external element to provide data to the control registers that can be utilized for configuring one or more of the elements within the CMOS backplane 100 and/or receive data from the control registers that can indicate a state of the CMOS backplane 100 (such as results of error detection operations). The UART interface 138 may allow for a physical controller area network (CAN) interface to a remote ECU. Further, the UART interface 138 may be used in conjunction with the UART interface 110 in some embodiments. The I$^2$C interface may be utilized in conjunction with the SPI 112, the I$^2$S interface 114, or the parallel interface 116. In some embodiments, the UART interface 138 and/or the I$^2$C interface 140 may be implemented as part of an SPI interface (such as the SPI interface 812 (FIG. 8)) or a bus interface (such as the bus transceiver 720 (FIG. 7)).

The CMOS backplane 100 may further include over temperature protection (OTP) circuitry 142. The OTP circuitry 142 may be coupled to one or more temperature sensors attached to the light emitting pixel array 102 and may receive temperature data related to temperatures of the light emitting pixel array 102 from the temperature sensors. For example, the CMOS backplane 100 includes a first temperature sensor 144a, a second temperature sensor 144b, a third temperature sensor 144c, and a fourth temperature sensor 144d attached to the light emitting pixel array 102 in the illustrated embodiment. The OTP circuitry 142 may be coupled to the first temperature sensor 144a, the second temperature sensor 144b, a third temperature sensor 144c, and a fourth temperature sensor 144*d*, and may receive temperature data related to the four locations to which the temperature sensors are attached from the temperature sensors. The OTP circuitry 142 may compare the temperatures represented by the temperature data to a threshold temperature to determine if the temperature of the light emitting pixel array 102 exceeds the threshold temperature, which may indicate that actions should be taken to reduce the temperature of the light emitting pixel array 102 and/or notice is to be provided of the temperature of the light emitting pixel array 102 exceeding the threshold temperature. In some embodiments, the OTP circuitry 142 may determine (such as by using an equation) a maximum temperature of the light emitting pixel array 102 based on the temperature data received from the temperature sensors and compare the maximum temperature of the light emitting pixel array 102 to determine whether actions should be taken to reduce the temperature of the light emitting pixel array 102 and/or whether notice is to be provided of the maximum temperature of the light emitting pixel array 102 exceeding the threshold temperature. Further, the OTP circuitry 142 may output an indication of the temperature exceeding the threshold temperature to a system in which the CMOS backplane 100 is implemented. In some embodiments, the OTP circuitry 142 may be implemented as part of a logic and control module (such as the logic and control module 820 (FIG. 8)), a microprocessor (such as the microcontroller 722 (FIG. 7)), or a sensor module (such as the sensor module 706 (FIG. 7)).

The CMOS backplane 100 may further include a dummy pixel 146. The dummy pixel 146 may be utilized for verifying a current provided by circuitry that sets the current for the pixel matrix and/or adjusting a current being provided by the circuitry. The dummy pixel 146 may include one or more of the features of the pixel driver 200 (FIG. 2), the pixel driver 302 (FIG. 3), the light emitting pixel array system 400 (FIG. 4), and/or the pixel block of the circuit schematic 600 (FIG. 6). For example, the dummy pixel 146 may have an identical arrangement to the pixel driver 200, the pixel driver 302, the pixel array system 400, or the pixel block of the circuit schematic 600 in some embodiments with the exception that the LED of the pixel driver 200, the pixel driver 302, or the pixel array system 400 is replaced with a resistor in the dummy pixel 146. The resistor may be placed outside of the CMOS backplane 100 in some embodiments. The dummy pixel 146 may output an indication of amount of current applied across the resistor by the circuitry that sets the current for the pixel matrix during operation, which may be representative of the amount of current applied across the pixels within the light emitting pixel array 102. The dummy pixel 146 may output the indication of the amount of current to a system in which the CMOS backplane 100 is implemented. The dummy pixel 146 is further described in relation to FIG. 5. In some embodiments, the dummy pixel 146 may be implemented as part of a pixel module (such as the pixel module 830 (FIG. 8)).

The CMOS backplane 100 may be implemented within a lighting system, where the light emitting pixel array 102 may provide the light of the lighting system and one or more of the other elements within the CMOS backplane 100 may be part of a controller of the lighting system. For example, the lighting system may comprise an LED lighting system and the one or more other elements within the CMOS backplane 100 may be part of an LED controller of the lighting system. In some embodiments, the lighting system may be a vehicle headlamp system. In these embodiments, the elements of the CMOS backplane 100 may be coupled to one or more of the systems of a vehicle in which the vehicle headlamp system is implemented, where power and/or communications can be received from the systems of the vehicle to power the elements of the CMOS backplane 100 and/or control at least a portion of the operation of the elements of the CMOS backplane 100.

FIG. 2 illustrates an example pixel driver 200, according to various embodiments. A plurality of pixel drivers 200 may be implemented within a light emitting pixel array, such as the light emitting pixel array 102 (FIG. 1). Each of the LEDs within the light emitting pixel array may be coupled to a corresponding pixel driver 200, where the pixel driver 200 may drive (i.e., power) the LED to which the pixel driver 200 is coupled. Accordingly, there may be a one-to-one ratio of the number of pixel drivers 200 to the number of LEDs within the light emitting pixel array. A pixel driver 200 may be located in a CMOS backplane (such as the CMOS backplane 100 (FIG. 1)) adjacent to an LED to which the pixel driver 200 is coupled and may be located within a footprint of the LED. In particular, the LED may be configured to emit light out of system in which the LED is implemented in a first direction, where the pixel driver 200 may be located adjacent to the LED at a side of the LED opposite to the first direction and the pixel driver 200 may be located within an area defined by the outer edges of the LED. In other embodiments, the pixel drivers 200 may be coupled to more than one LED within the light emitting pixel array, where the pixels drivers may drive (i.e., power) more than one LED. In the illustrated embodiment, the pixel driver 200 is illustrated coupled to a single LED 202, where the pixel driver 200 may drive (i.e., power) the LED 202.

The pixel driver 200 may receive an LED voltage (VLED) signal 204, a PWM signal 206, and a voltage reference (VREF) signal 208. The VLED signal 204 may be received from a high current source, which can be used to power the pixel driver 200 and the LED 202. In embodiments where the light emitting pixel array including the pixel driver 200 is implemented in a vehicle, the pixel driver 200 may receive the VLED signal 204 from a power system of the vehicle in some of the embodiments. A voltage of the VLED signal 204 may be based on a maximum forward voltage of one of the LEDs within a light emitting pixel array, where the one of the LEDs has a highest forward voltage of the LEDs within the light emitting pixel array. For example, the voltage of the VLED signal 204 may be set to be within a certain voltage above a maximum voltage for the light emitting pixel array determined based on the highest forward voltage of the LEDs. The maximum forward voltage of the one of the LEDs may be determined during manufacture of the light emitting pixel array or may be determined by testing the LEDs during operation. The PWM signal 206 may be received from a PWM generator (such as the PWM generator circuitry 132 (FIG. 1)) of the CMOS backplane in which the pixel driver 200 is implemented. The VREF signal 208 may be received from a reference source element (such as the reference source element 106 (FIG. 1)) of the CMOS backplane in which the pixel driver 200 is implemented.

The pixel driver 200 may include a first switch 210 and a second switch 212. The first switch 210 may be implemented as a first field effect transistor (FET) and the second switch 212 may be implemented as a second FET, as shown in the illustrated embodiment. The PWM signal 206 may be coupled to a gate of the first FET of the first switch 210. The PWM signal 206 may cause the first switch 210 to turn on and off based on a value of the PWM signal 206 at a time, which in turn causes the second switch 212 to turn on and off. A source of the second switch 212 may receive the VLED signal 204 and a drain of the second switch 212 may be coupled to an anode of the LED 202. As the second switch 212 turns on the VLED signal 204 may be provided to the LED 202 causing the LED 202 to turn on, and as the second switch 212 turns off the VLED signal 204 may be removed from the LED 202 causing the LED 202 to turn off. The pixel driver 200 may operate as an LDO constant current source for the LED 202.

The pixel driver 200 may further include an operational amplifier 214. The operational amplifier 214 may receive the VREF signal 208 and the VLED signal 204 as inputs. The VREF signal 208 may be utilized to set a maximum drive current to be provided to the LED 202. An output of the operational amplifier 214 may be coupled to a gate of the second FET of the second switch 212, where the second switch 212 can limit the current being provided to the LED 202 through the second switch 212 to be below or equal to the maximum drive current, thereby limiting the current through the LED 202 to be below or equal to the maximum drive current.

The pixel driver 200 may further include a bidirectional switch 216. The bidirectional switch 216 may have an input/output coupled between the second switch 212 and the anode of the LED 202. The bidirectional switch 216 can be utilized for injecting small currents directly into the LED 202 for characterization and/or test purposes. For example, the other elements (such as the first switch 210, the second switch 212, and the operational amplifier 214) may be bypassed for performance of characterization and/or test purposes of the LED 202. Further, the bidirectional switch 216 may be utilized for monitoring a forward voltage of the LED 202 during operation and/or while the CMOS package in which the pixel driver 200 is implemented is performing in diagnostics mode. The pixel driver 200 may provide the results of the characterization, testing, monitoring of the forward voltage of the LED 202, and/or the diagnostics to another element of the CMOS backplane (such as the control registers 136 (FIG. 1)). In some embodiments, the pixel driver 200 may be implemented in a pixel module (such as the pixel module 830 (FIG. 8)), where the pixel module may include one or more pixel drivers having the features of the pixel driver 200.

Figure 3:
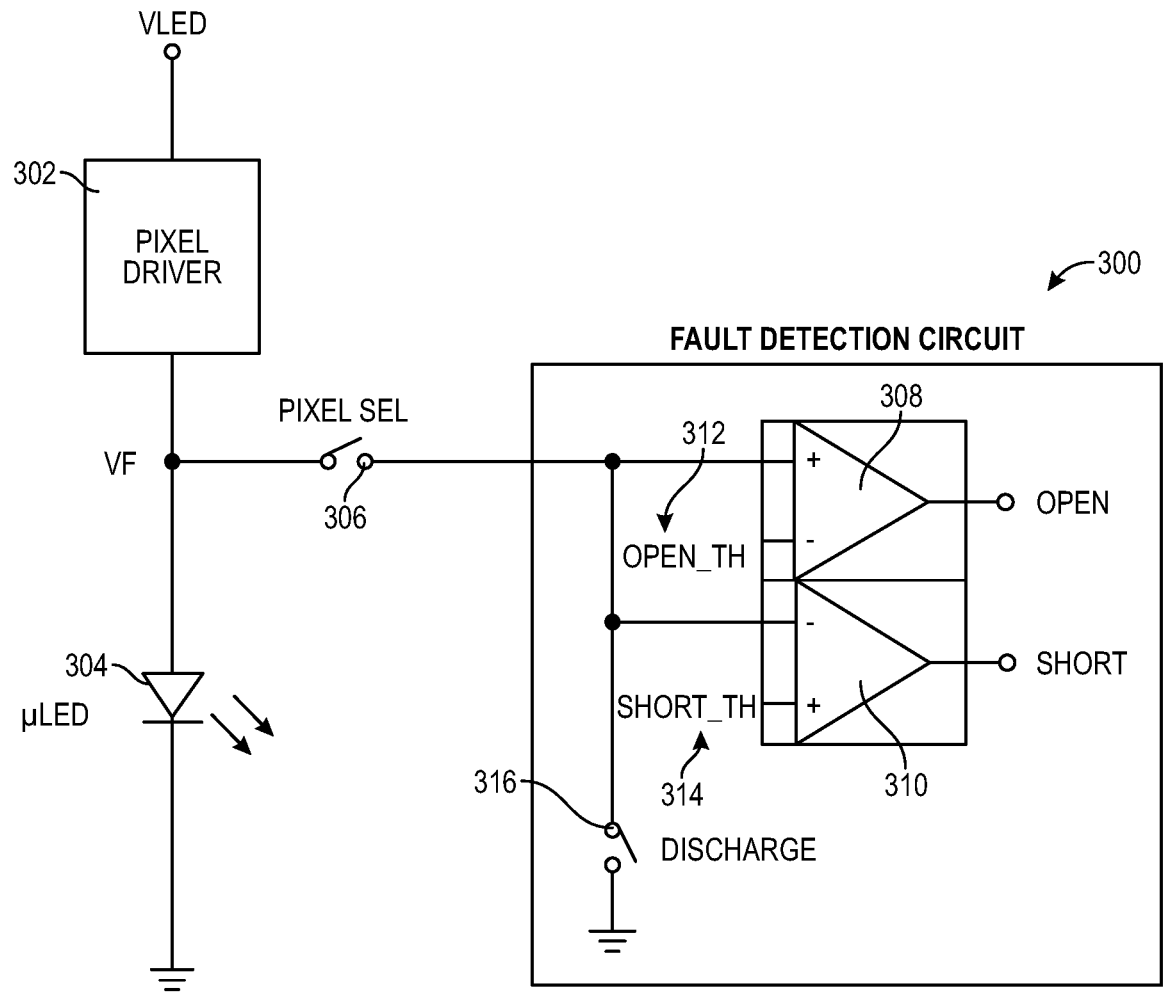
FIG. 3 illustrates an example fault detection circuit, according to various embodiments.

FIG. 3 illustrates an example fault detection circuit 300, according to various embodiments. The fault detection circuit 300 may be implemented within a CMOS backplane (such as the CMOS backplane 100) or a pixel driver (such as the pixel driver 200). In embodiments where the fault detection circuit 300 is implemented in a CMOS backplane outside of the pixel driver, the CMOS backplane may include as many fault detection circuits 300 as pixels within a light emitting pixel array (such as the light emitting pixel array 102 (FIG. 1)) or may include less fault detection circuits 300 than the pixels within the light emitting pixel array. In the embodiments where the CMOS backplane includes less fault detection circuits 300 than the pixels within the light emitting pixel array, the fault detection circuits 300 may be selectively coupled to each of the pixels within the light emitting pixel array at different times, where a fault detection circuit 300 may perform fault detection on the pixel to which the fault detection circuit 300 is coupled at the time. In the illustrated embodiment, the fault detection circuit 300 is shown included in a CMOS backplane and separate from a pixel driver of the CMOS backplane.

The fault detection circuit 300 may be selectively coupled between a pixel driver 302 and an LED 304 of a light emitting pixel array, where the pixel driver 302 may include one or more of the features of the pixel driver 200 (FIG. 2), and the LED 304 may be a μLED in some embodiments. The fault detection circuit 300 may be coupled between the pixel driver 302 and the LED 304 by an element that can selectively couple the fault detection circuit 300 between the pixel driver 302 and the LED 304. In the illustrated embodiment, a switch 306 that can selectively couple the fault detection circuit 300 between the pixel driver 302 and the LED 304. In other embodiments, the switch 306 may be replaced by a multiplexer that can couple the fault detection circuit 300 between the pixel driver 302 and LED 304, or between other pixel drivers and LEDs within the light emitting pixel array. When the switch 306 is closed, an input of the fault detection circuit 300 may be coupled between the pixel driver 302 and the LED 304. When the switch 306 is open, the input of the fault detection circuit 300 may be decoupled from between the pixel driver 302 and the LED 304.

The fault detection circuit 300 may include a first comparator 308 and a second comparator 310. The first comparator 308 may have a first input coupled to the input of the fault detection circuit 300 and a second input of the first comparator 308 may receive an open threshold voltage 312. When fault detection is being performed for the pixel driver 302 and/or the LED 304, the first comparator 308 may compare a forward voltage of the LED 304 to the open threshold voltage 312 to determine whether the LED 304 is open and/or the pixel driver 302 is shorted. For example, the first comparator 308 may determine whether the forward voltage of the LED 304 exceeds the open threshold voltage 312, and may determine that the LED 304 is open and/or the pixel driver 302 is shorted based on a determination that the forward voltage of the LED 304 exceeds the open threshold voltage 312.

The second comparator 310 may have a first input coupled to the input of the fault detection circuit 300 and second input of the second comparator 310 may receive a short threshold voltage 314. When fault detection is being performed for the pixel driver 302 and/or the LED 304, the second comparator 310 may compare the forward voltage of the LED 304 to the short threshold voltage 314 to determine whether the LED 304 is shorted and/or the pixel driver 302 is open. For example, the second comparator 310 may determine whether the forward voltage of the LED 304 is below the short threshold voltage 314, and may determine that the LED 304 is shorted and/or the pixel driver 302 is open based on a determination that the forward voltage of the LED 304 is below the short threshold voltage 314. Detection of the open or shorted LED 304 and/or pixel driver 302 may help determine which pixels of a light emitting pixel array are faulted so power can be avoided from being applied to the faulted pixels and/or it can be determined when a light emitting pixel array should be replaced on the number of faulted pixels.

The fault detection circuit 300 may further include a discharge switch 316. The discharge switch may be coupled between the input of the fault detection circuit 300 and a ground of the CMOS backplane in which the fault detection circuit 300 is implemented. The discharge switch 316 may be utilized to discharge a forward voltage of the LED 304 when the discharge switch 316 is closed. In some embodiments, the fault detection circuit 300 may be implemented within an LED power distribution and monitor module (such as the LED power distribution and monitor module 810 (FIG. 8)) or a logic and control module (such as the logic and control module 820 (FIG. 8)).

Figure 4:
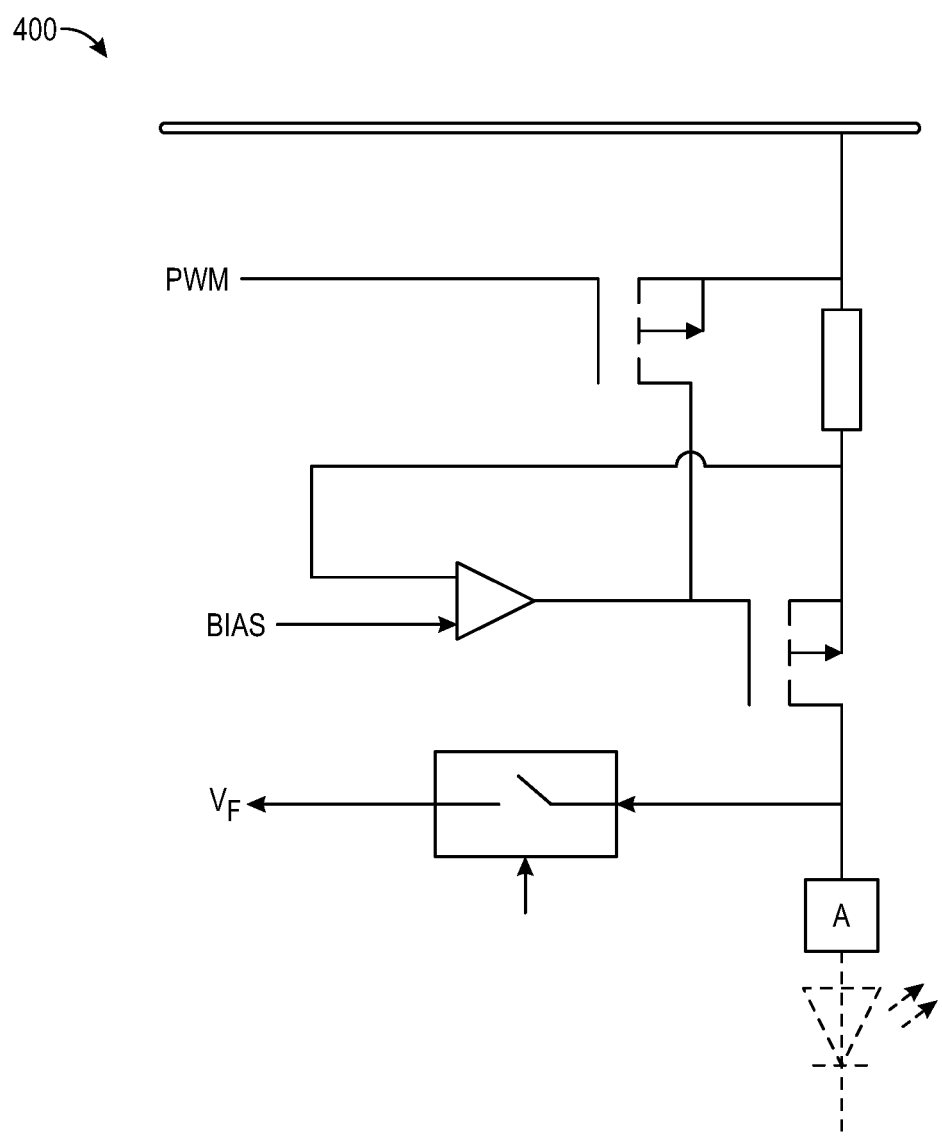
FIG. 4 illustrates one embodiment of a pixel block usable in an active matrix pixel array system.

FIG. 4 illustrates one embodiment of a light emitting pixel array system 400 suitable for use in conjunction with a μLED segmented pixel array. The μLED segmented pixel array includes μLED pixel blocks controlled by an active matrix pixel array system such as disclosed herein. Each pixel block can include a low dropout regulator (LDO) that provides a constant current to each LED pixel. The maximum current per LDO can be set globally through a BIAS input. Each pixel can be dimmed through pulse width modulation (PWM). PWM frequency can be set globally with the PWMOSC between 430 and 570 Hz through an I2C register or other suitable control system. The input signal 10-bit data can be used to determine the PWM duty cycle. In one embodiment, the rising edge of the PWM pulse can be phase shifted in 328 dimming groups (72 pixels per group, 2 rows, 36 columns) to reduce current spikes on VLED.

Various diagnostic modes are supported, including an On-the-fly outage detection modes that checks for LED pixel open/short or LDO open/short during operation. This detection can be done when a pixel is turned on with a duty cycle >1%. Each pixel can be tested multiple consecutive times (e.g. four or more testing cycles) to avoid erroneous error messages. The row and column address of the faulty pixel can be stored in a register and can be read out through I2C. Full detection time for the entire matrix is 24 s.

Alternatively, a diagnostic mode in which each pixel is individually selected through I2C or the image interface can be used. In this mode, the Vf of each pixel is connected to the Vf bus as each pixel is addressed to allow for a Vf measurement through an ADC. The current per pixel can be determined by setting VBIAS and having the LDO drive the pixel, or by switching the LDO off and driving an external current through the Vfout pin of ~1 μA. Typically, the switch that connects the pixel anode to the Vf bus has an impedance of ~2 kΩ.

Figure 5:
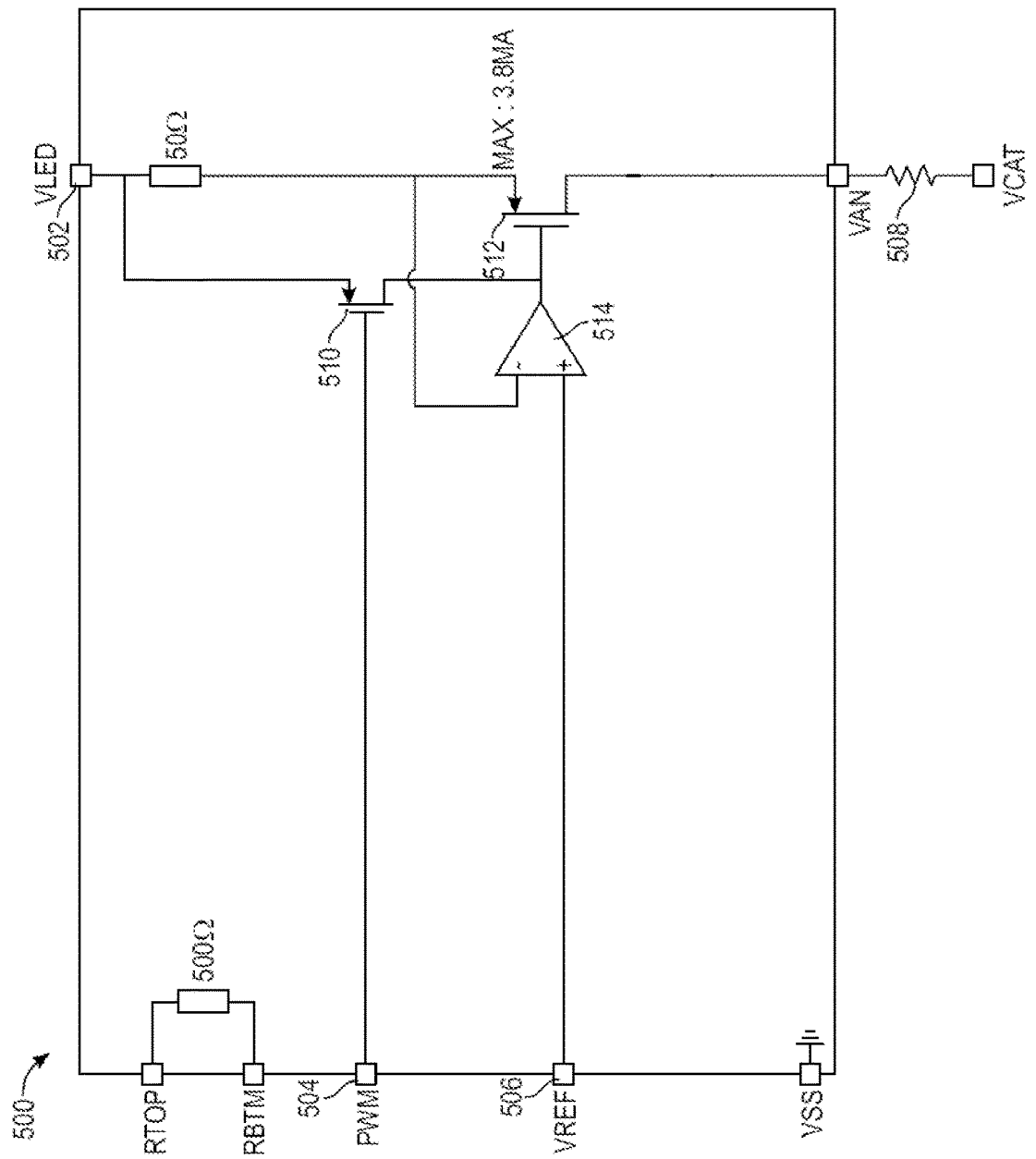
FIG. 5 illustrates an example dummy pixel, according to various embodiments.
Figure 6:
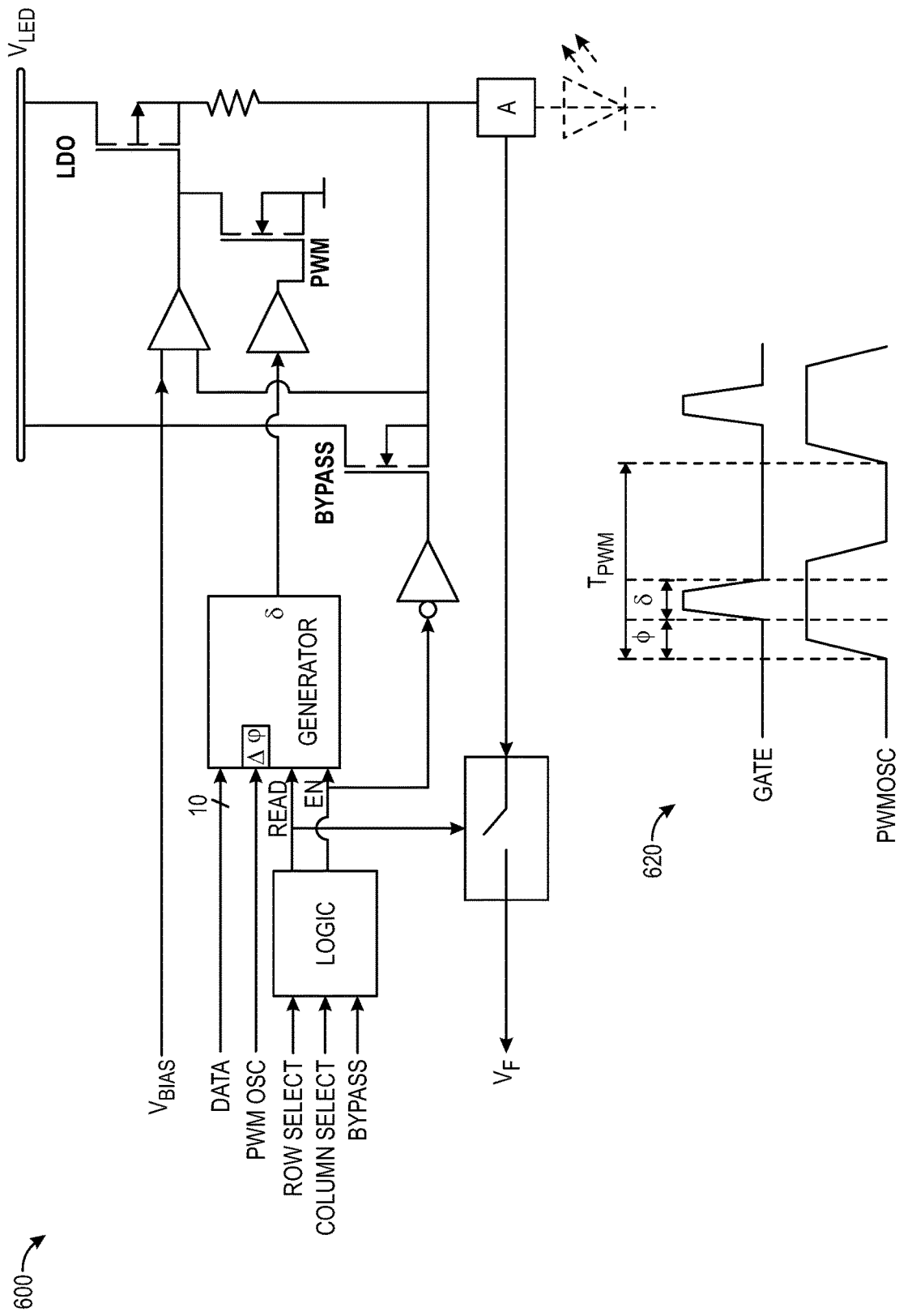
FIG. 6 illustrates an alternative embodiment of a pixel block usable in an active matrix pixel array system.

FIG. 5 illustrates an example dummy pixel 500, according to various embodiments. For example, the dummy pixel 500 may be implemented as the dummy pixel 146 (FIG. 1). The dummy pixel 500 may be utilized for utilized for verifying a current provided by circuitry that sets the current for the pixel matrix and/or adjusting a current being provided by the circuitry. The dummy pixel 500 may be implemented in a CMOS backplane (such as the CMOS backplane 100 (FIG. 1)), where the CMOS backplane may drive a light emitting pixel array (such as the light emitting pixel array 102 (FIG. 1)). The CMOS backplane may further drive the dummy pixel 500, where the dummy pixel 500 may be driven by the same circuitry of the CMOS backplane that drives the light emitting pixel array.

The dummy pixel 500 may receive an LED voltage (VLED) signal 502, a PWM signal 504, and a voltage reference (VREF) signal 506. The VLED signal 502 may be received from a high current source, which can be used to power the dummy pixel 500 and a resistor 508 of the dummy pixel 500. The high current source may further provide VLED signals to the light emitting pixel array driven by the CMOS backplane in which dummy pixel 500 is implemented, where the high current source may provide a same amount of current to the dummy pixel 500 as provided to the LEDs within the light emitting pixel array. In embodiments where the dummy pixel 500 is implemented in a vehicle, the dummy pixel 500 may receive the VLED signal 502 from a power system of the vehicle in some of the embodiments. A voltage of the VLED signal 502 may be based on a maximum forward voltage of one of the LEDs within a light emitting pixel array, where the one of the LEDs has a highest forward voltage of the LEDs within the light emitting pixel array. For example, the voltage of the VLED signal 502 may be set to be within a certain voltage above a maximum voltage for the light emitting pixel array determined based on the highest forward voltage of the LEDs. The maximum forward voltage of the one of the LEDs may be determined during manufacture of the light emitting pixel array or may be determined by testing the LEDs during operation. The PWM signal 504 may be received from a PWM generator (such as the PWM generator circuitry 132 (FIG. 1)) of the CMOS backplane in which the dummy pixel 500 is implemented. The VREF signal 506 may be received from a reference source element (such as the reference source element 106 (FIG. 1)) of the CMOS backplane in which the dummy pixel 500 is implemented.

The dummy pixel 500 may include a first switch 510 and a second switch 512. The first switch 510 may be implemented as a first field effect transistor (FET) and the second switch 512 may be implemented as a second FET, as shown in the illustrated embodiment. The first switch 510 and the second switch 512 may have the same characteristics (within 5% variance) as corresponding first switches and second switches within pixel drivers (such as the pixel driver 200 (FIG. 2)) implemented in a same CMOS backplane as the dummy pixel 500. The PWM signal 504 may be coupled to a gate of the first FET of the first switch 510. The PWM signal 504 may cause the first switch 510 to turn on and off based on a value of the PWM signal 504 at a time, which in turn causes the second switch 512 to turn on and off. A source of the second switch 512 may receive the VLED signal 502 and a drain of the second switch 512 may be coupled to the resistor 508. As the second switch 512 turns on the VLED signal 502 may be provided to the resistor 508 causing the resistor 508 to turn conduct current, and as the second switch 512 turns off the VLED signal 502 may be removed from the resistor 508 causing current not to conducted across the resistor 508.

The dummy pixel 500 may further include an operational amplifier 514. The operational amplifier 514 may have the same characteristics (within 5% variance) as corresponding operational amplifiers within pixel drivers (such as the pixel driver 200) implemented in a same CMOS backplane as the dummy pixel 500. The operational amplifier 514 may receive the VREF signal 506 and the VLED signal 502 as inputs. The VREF signal 506 may be utilized to set a maximum drive current to be provided to the resistor 508. An output of the operational amplifier 514 may be coupled to a gate of the second FET of the second switch 512, where the second switch 512 can limit the current being provided to the resistor 508 through the second switch 512 to be below or equal to the maximum drive current, thereby limiting the current through the resistor 508 to be below or equal to the maximum drive current.

Due to the elements within the dummy pixel 500 having the same characteristics (within 5% variance) as the pixel drivers implemented in a same CMOS backplane as the dummy pixel 500 with the exception of the resistor 508 of the dummy pixel 500 replacing the corresponding LEDs of the pixel drivers, the dummy pixel 500 may have the same amount of current (within 5% variance) driven across the resistor 508 as the pixels drivers have driven across the corresponding LEDs. The dummy pixel 500 may output an indication of the current being driven across the resistor 508, which may indicate an amount of current driven across the LEDs of the pixel drivers based on the relationship between the current driven across the resistor 508 and the current driven across the LEDs. The indication of the current being driven across the resistor 508 may be provided to a system in which the CMOS backplane is implemented. The system may utilize the indication of the current being driven across the resistor 508 to determine whether the current being driven across the LEDs is the current intended to be driven across the LEDs and/or compensate for any inaccuracy of the current being driven across the LEDs from the intended current.

While the dummy pixel 500 illustrated and described herein corresponds to the pixel driver 200, it should be understood that the dummy pixel 500 may correspond to the pixel array system 400 or the pixel block of the circuit schematic 600. In particular, the dummy pixel 500 may have the arrangement of the pixel array system 400 or the pixel block of the circuit schematic 600, or some portion thereof, in other embodiments with the dummy pixel 500 having a resistor replacing the LED of the pixel array system 400 or the LED of the pixel block of the circuit schematic 600. For example, in embodiments of a CMOS backplane that implements the pixel array system 400, the dummy pixel 500 may include the same elements as the pixel array system 400 in a same arrangement with the exception that the LED of the pixel array system 400 is replaced with a resistor in the dummy pixel 500. Further, the elements of the dummy pixel 500 may have the same characteristics (within 5% variance) as the elements of the pixel array system 400. In embodiments of a CMOS backplane that implements the pixel block of the circuit schematic 600, or some portion thereof, the dummy pixel 500 may include the same elements as the pixel block, or portion thereof, in a same arrangement with the exception that the LED of the pixel block is replaced with a resistor in the dummy pixel 500. Further, the elements of the dummy pixel 500 may have the same characteristics (within 5% variance) as the elements of the pixel block. Accordingly, the dummy pixel 500 may be utilized for determining an amount of current driven across the pixel of the pixel array system 400 or the pixel block of the circuit schematic 600 in embodiments.

FIG. 6 illustrates one alternative embodiment of a pixel block that is usable in an active matrix array supporting LDO bypass. In one embodiment illustrated by circuit schematic 600 and associated timing diagram 520, factory calibration a Vf of all pixels can be measured at 1.0 μA and 1.0 mA using an external current source and LDO bypass functionality. As illustrated in FIG. 4, image data and pulse width modulation oscillation clock data can be received by a pulse width modulator. Based on input from a logic module, gate timing including pulse start, ramp time and pulse duration/width (duty cycle) can be set on a per pixel basis. For example, the duty cycle (δ) can be loaded from frame buffer on "read". An 8-bit δ resolution can be supported. In one embodiment, the pulse leading-edge phase shift (b) can be set differently for each pixel.

This operation can be bypassed when the LED pixel is supported by a low dropout (LDO) linear regulator as illustrated in the circuit diagram. During bypass Vf can be measured either with internal 1 μA current source or external current source on VLED. Bypass can be done as a pixel by pixel operation using row and column select.

Figure 7:
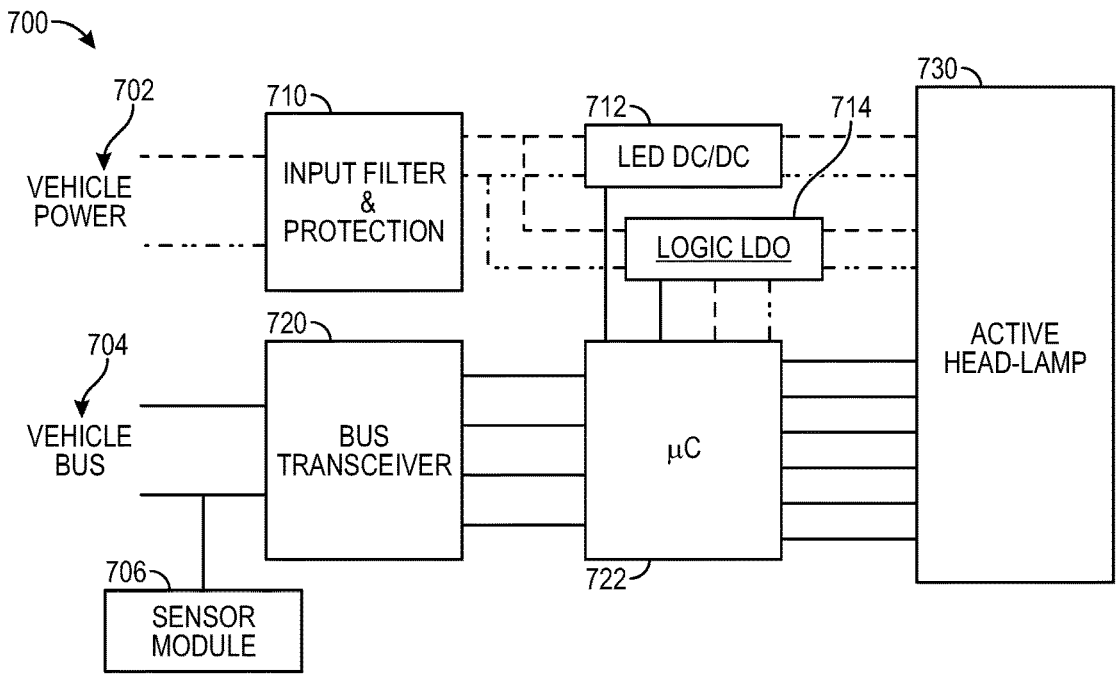
FIG. 7 is a vehicle headlamp system for controlling an active headlamp.

FIG. 7 illustrates an embodiment of an active matrix pixel array system suitable for use in a vehicle headlamp system 700. System 700 can include connection with a vehicle supported power (702) and control system including a data bus (704). A sensor module 706 can be connected to the data bus 704 to provide data related to environment conditions (e.g. time of day, rain, fog, ambient light levels, etc.), vehicle condition (parked, in-motion, speed, direction), or presence/position of other vehicles or pedestrians. A separate headlamp controller 730 can be connected to the vehicle supported power and control system.

The vehicle headlamp system 700 can include a power input filter and control module 710. The module 710 can support various filters to reduce conducted emissions and provide power immunity. Electrostatic discharge (ESD) protection, load-dump protection, alternator field decay protection, and reverse polarity protection can also be provided by module 710.

Filtered power can be provided to a LED DC/DC module 712. Module 712 can be used only for powering LEDs, and typically has an input voltage of between 7 and 18 volts, with a nominal 13.2 volts. Output voltage can be set to be slightly higher (e.g. 0.3 volts) than LED array max voltage can be dynamically adjusted as determined by factory or local calibration, and operating condition adjustments due to type of presented image, load, temperature, or other factors.

Filtered power is also provided to a logic LDO module 714 that can be used to power microcontroller 722 or CMOS logic in the active headlamp 730.

The vehicle headlamp system 700 can also include a bus transceiver 720 (e.g. with a UART or SPI interface) connected to microcontroller 722. The microcontroller 722 can translate vehicle input based on or including data from the sensor module 706. The translated vehicle input can include a video signal that is transferrable to an image buffer in the active headlamp module 730. In addition, the microcontroller 722 can load default image frames and test for open/short pixels during startup. In one embodiment, a SPI interface loads an image buffer in CMOS. Image frames can be full frame, differential or partial. Other microcontroller 722 features can include control interface monitors of CMOS status, including die temperature, as well as logic LDO output. In some embodiments, LED DC/DC output can be dynamically controlled to minimize headroom. In addition to providing image frame data, other headlamp functions such as complementary use in conjunction with side marker or turn signal lights, and/or activation of daytime running lights can also be controlled.

Figure 8:
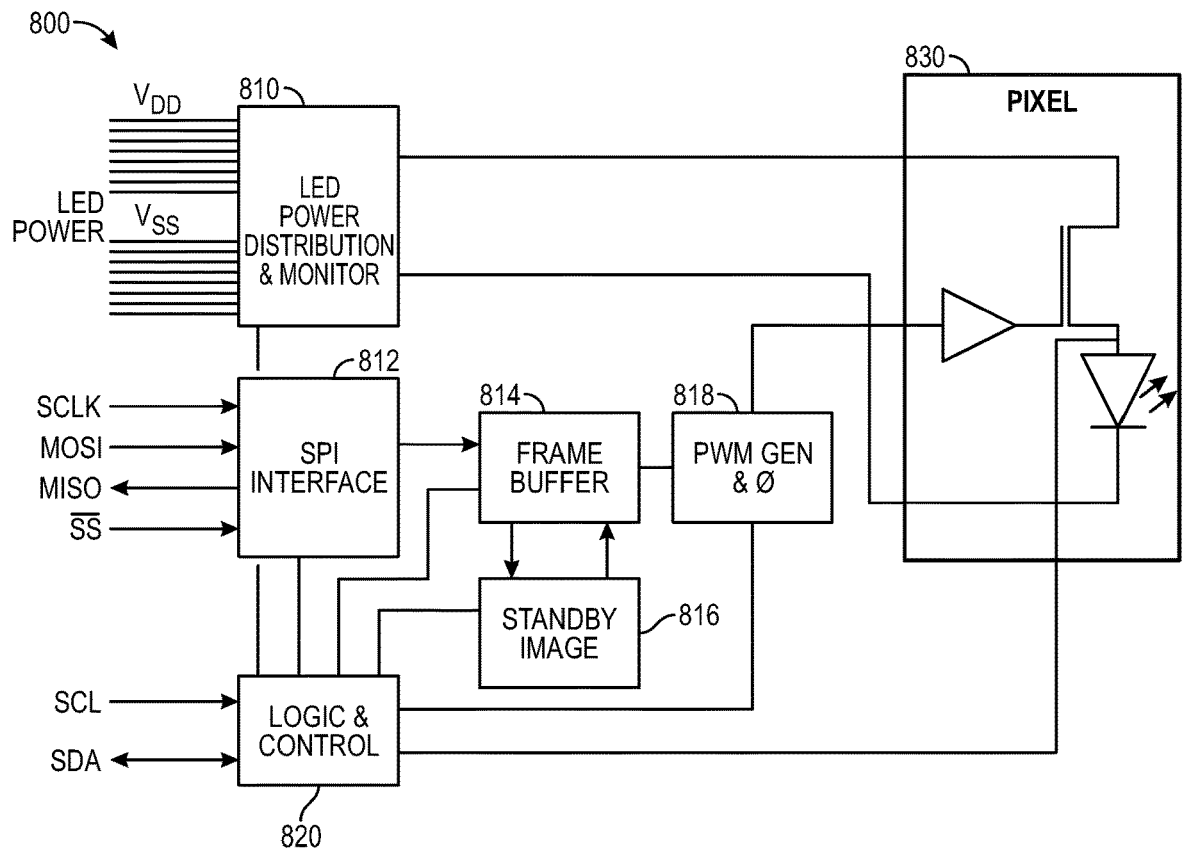
FIG. 8 is a schematic illustration of one embodiment of an active headlamp controller.

FIG. 8 illustrates one embodiment of various components and modules of an active headlamp system 800 such as described with respect to active headlamp 730 of FIG. 7. As illustrated, internal modules include an LED power distribution and monitor module 810 and a logic and control module 820.

Image or other data from the vehicle can arrive via an SPI interface 812. Successive images or video data can be stored in an image frame buffer 814. If no image data is available, one or more standby images held in a standby image buffer 816 can be directed to the image frame buffer 814. Such standby images can include, for example, an intensity and spatial pattern consistent with legally allowed low beam headlamp radiation patterns of a vehicle.

In operation, pixels in the images are used to define response of corresponding LED pixels in the pixel module 830, with intensity and spatial modulation of LED pixels being based on the image(s). To reduce data rate issues, groups of pixels (e.g. 5×5 blocks) can be controlled as single blocks in some embodiments. High speed and high data rate operation is supported, with pixel values from successive images able to be loaded as successive frames in an image sequence at a rate between 30 Hz and 100 Hz, with 60 Hz being typical. In conjunction with a pulse width modulation module 818, each pixel in the pixel module can be operated to emit light in a pattern and with an intensity at least partially dependent on the image held in the image frame buffer 814.

In one embodiment, intensity can be separately controlled and adjusted by setting appropriate ramp times and pulse width for each LED pixel using logic and control module 820 and the pulse width modulation module 818. This allows staging of LED pixel activation to reduce power fluctuations, and to provide various pixel diagnostic functionality.

Figure 9:
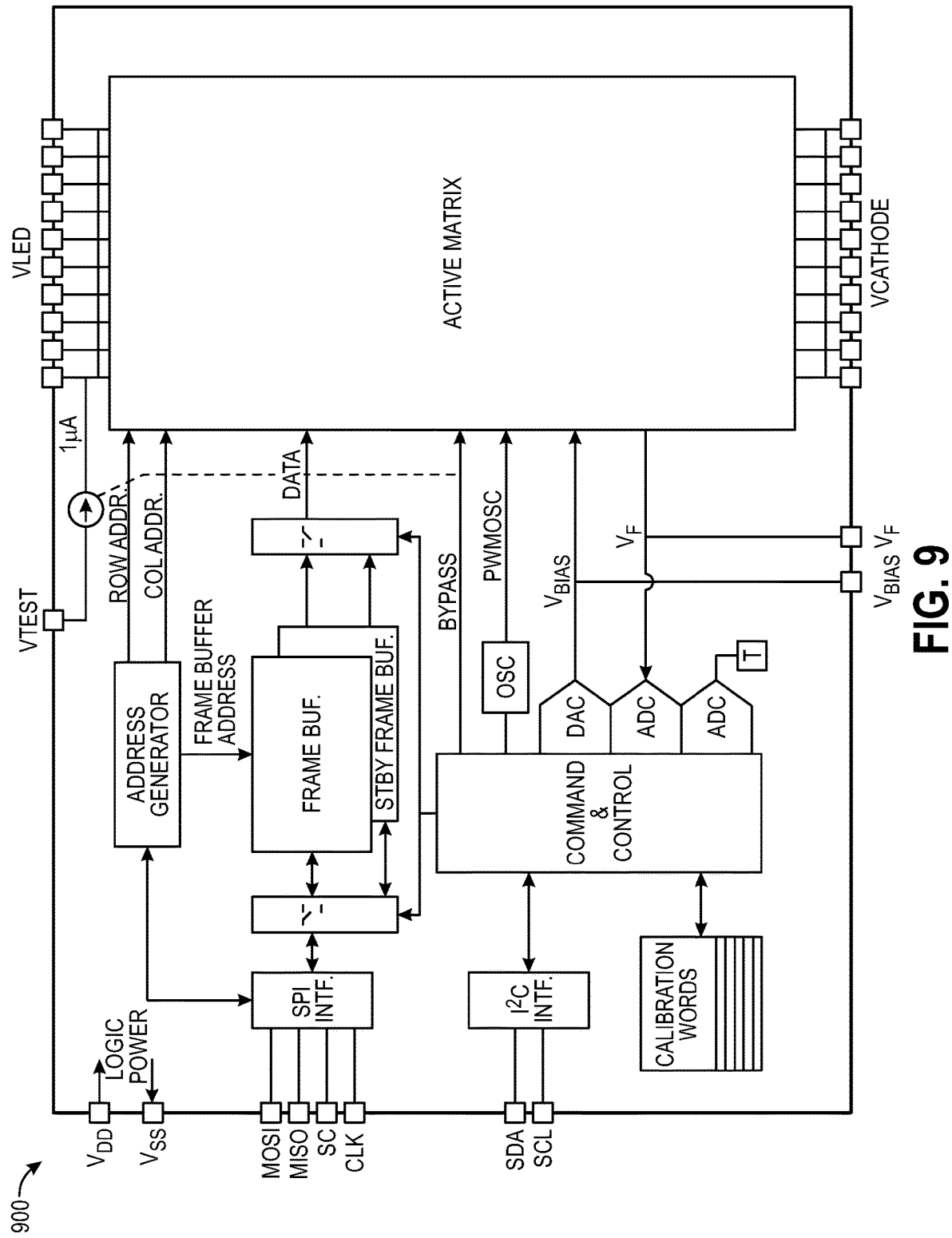
FIG. 9 is an illustration of a microcontroller assembly for an LED pixel array.

FIG. 9 illustrates a microcontroller assembly 900 for an LED pixel array. The assembly 900 can receive logic power via Vdd and Vss pins. An active matrix receives power for LED array control by multiple $V_{LED}$ and $V_{Cathode}$ pins. A Serial Peripheral Interface (SPI) can provide full duplex mode communication using a master-slave architecture with a single master. The master device originates the frame for reading and writing. Multiple slave devices are supported through selection with individual slave select (SS) lines. Input pins can include a Master Output Slave Input (MOSI), a Master Input Slave Output (MISO), a chip select (SC), and clock (CLK), all connected to the SPI interface.

In one embodiment, the SPI frame includes 2 stop bits (both "0"), 10 data bits, MSB first, 3 CRC bits (x3+x+1), a start 111b, and target 000b. Timing can be set per SafeSPI "in-frame" standards.

MOSI Field data can be as follows:
Frame 0: Header
Frame 1/2: Start Column Address [SCOL]
Frame 3/4: Start Row Address [SROW]
Frame 5/6: Number of Columns [NCOL]
Frame 7/8: Number of Rows [NROW]
Frame 9: Intensity pixel [SCOL, SROW]
Frame 10: Intensity pixel [SCOL+1, SROW]
Frame 9+NCOL: Intensity pixel [SCOL+NCOL, SROW]
Frame 9+NCOL+1: Intensity pixel [SCOL, SROW+1]
Frame 9+NCOL+NROW: Intensity pixel [SCOL+NCOL, SROW+NROW]

MISO Field data can include loopback of frame memory.

A field refresh rate at 60 Hz (60 full frames per second) is supported, as is a bit rate of at least 10 Mbps, and typically between 15-20 Mbps.

The SPI interface connects to an address generator, frame buffer, and a standby frame buffer. Pixels can have parameters set and signals or power modified (e.g. by power gating before input to the frame buffer, or after output from the frame buffer via pulse width modulation or power gating) by a command and control module. The SPI interface can be connected to an address generation module that in turn provides row and address information to the active matrix. The address generator module in turn can provide the frame buffer address to the frame buffer.

The command and control module can be externally controlled via an Inter-Integrated Circuit (I²C) serial bus. A clock (SCL) pin and data (SDA) pin with 7-bit addressing is supported.

The command and control module include a digital to analog converter (DAC) and two analog to digital converters (ADC). These are respectively used to set $V_{bias}$ for a connected active matrix, help determine maximum $V_f$, and determine system temperature. Also connected are an oscillator (OSC) to set the pulse width modulation oscillation (PWMOSC) frequency for the active matrix. A bypass line is also present to allow address of individual pixels or pixel blocks in the active matrix for diagnostic, calibration, or testing purposes.

In one embodiment, the command and control module can provide the following inputs and outputs:
Input to CMOS chip:
VBIAS: Sets voltage bias for LDO's.
GET_WORD[ . . . ]: Requests Output from CMOS.
TEST_M: Run Pixel Test: LDO in bypass mode, sequentially addresses columns, then rows, outputs VF, using internal 1 µA source.
Vf values output via SPI.
TEST_M2: Run Pixel Test: LDO in bypass mode, sequentially addresses columns, then rows, outputs VF, using external I source.
Vf values output via SPI.
TEST_M3: LDO in bypass mode, addressing through I2C, using internal 1 µA source, Vf output via I2C.
TEST_M4: LDO in bypass mode, addressing through I2C, using external I source, Vf output via I2C.
BUFFER_SWAP: Swap to/from standby buffer.
COLUMN_NUM: Addresses a specific row.
ROW_NUM: Addresses a specific column.
Output from CMOS chip:
CW_PHIV_MIN, CW_PHIV_AVG, CW_PHIV_MAX: factory measured EOL global luminous flux data.
CW_VLED_MIN, CW_VLED_AVG, CW_VLED_MAX: factory measured EOL global forward voltage data.
CW_SERIALNO: die/CMOS combo serial number for traceability purposes.
TEMP_DIE: Value of Die Temperature.
VF: Value of Vf bus when being addressed with COLUMN_NUM and ROW_NUM.
BUFFER_STATUS: Indicates which buffer is selected.

Various calibration and testing methods for microcontroller assembly 900 are supported. During factory calibration a $V_f$ of all pixels can be measured. Maximum, minimum and average Vf of the active area can be "burned" as calibration frame within a calibration data storage module, where the calibration data storage module may be coupled to the command and control module. Maximum Vf and dVf/dT calibration frames can be used together with measured die temperature to determine actual $V_{LED}$ dynamically. For example, the maximum Vf and dVf/dT calibration frames may comprise calibration data and the Vf and the dVf/dT may comprise the pixel voltage responses of the LEDs within the LED pixel array. The calibration data may enable modification of a voltage provided by a dynamic power supply to the LED pixel, where the modification may be based on an image to be presented by the LED pixel array. Typically, a $V_{LED}$ of between 3.0V-4.5V is supported, with actual value being determined by feedback loop to external DC/DC converter such as described with respect to FIG. 7.

FIG. 9A and FIG. 9B illustrate another embodiment of a CMOS backplane for a microcontroller assembly 1000 of an active matrix pixel array. Generally, this embodiment allows for various features and functionality, including an ability to drives up to 20,172 (1:3) or 20,162 (1:4) pixels in parallel, individually addressable at 3.8 mA maximum per pixel.

In this embodiment, a global bias voltage sets maximum current per pixel between 0.6 and 3.8 mA and each pixel can be dimmed using PWM with 10-bit resolution and minimum PWM frequency of 500 Hz. The total maximum backplane current can be 17.0 A, with no internal monitoring/protection. Voltage can be dynamically regulated across VLED-VCAT to the lowest possible to minimize thermal load. The highest Vf measured on the LED die is loaded as a calibration word and can be retrieved through I2C as CW_VLED_MAX. This calibration is done at the maximum pixel current of 3.8 mA.

The 0.4V is the maximum headroom for the LDO driving each pixel. TEMP_DIE_MIN is the lowest CMOS die temperature measured and can be retrieved via I2C.

Pixel pitch can be 40 μm with square pixel geometry. Differing pixel array aspect ratios are supported, with 1:3 pixel array aspect ratio (246*82 pixels) offered in one embodiment, while 1:4 pixel array aspect ratio option also being supported. LED pixels can be in either a common cathode or anode configuration. In some embodiments, LED power can be provided separate from logic power.

A number of interfaces can also be supported. In one embodiment, a quad SPI serial interface (20 Mbps) can be used for direct image loading from a local microcontroller. Interfaces can run in single SPI mode. In other embodiments, an I2S interface (20 Mbps) can be used for image loading as alternative to SPI. A parallel interface (<58 MHz) can be used with off-board LVDS deserializer for image loading, and an 8-bit High speed UART image (20 MBps) interface with programmable piece-wise linear expansion to 10 bits can be used.

In some embodiments, image bus speeds can support maximum 60 full frames per second refresh rate. Dual Frame buffers can be used to allow for emergency backup operation in case of communications failure. Buffer swap can be automatic or manual and buffer status can be read out using I2C bus.

I2C or UART interface provides a status and control of the CMOS backplane operation and configuration. As previously noted with respect to FIGS. 4 and 5, a diagnostics mode can be provided to test individual pixels for open/short or leaky condition. Vf per pixel can be read out over a separate pin or I2C (only with specific diagnostic mode enabled).

Reliability can be further increased by use of an Under Voltage Lockout on logic supply voltages. Die temperature can be measured in multiple different locations (e.g. four locations on the array), with temperature data made available through I2C bus.

More particularly, FIG. 9A and FIG. 9B illustrate a system having an active LED matrix that receives power for LED array control by multiple VLED and VCathode (VCAT) pins. A Quad Serial Peripheral Interface (Quad SPI) can provide full duplex mode communication using a master-slave architecture with a single master. The master device originates the frame for reading and writing. Multiple slave devices are supported through selection with individual slave select (SS) lines. Input pins can include a Master Output Slave Input (MOSI), a Master Input Slave Output (MISO), a chip select (SC), and clock (CLK), all connected to the SPI interface. The SPI interface connects to an address generator, frame buffer, and a standby frame buffer. Pixels can have parameters set and signals or power modified (e.g. by power gating before input to the frame buffer, or after output from the frame buffer via pulse width modulation or power gating) by a command and control module.

A Control, Status, and Watchdog module can be externally controlled via an Inter-Integrated Circuit (I2C) serial bus. A clock (SCL) pin and data (SDA) pin with 7-bit addressing is supported. The Control, Status, and Watchdog can include a digital to analog converter (DAC) and two analog to digital converters (ADC). These are respectively used to set Vbias for a connected active matrix, help determine maximum Vf, and determine system temperature. Also connected are an oscillator (OSC) to set the pulse width modulation oscillation (PWMOSC) frequency for the active matrix. A dummy pixel driver allows address of individual pixels or pixel blocks in the active matrix for diagnostic, calibration, or testing purposes.

FIG. 11A and FIG. 11B illustrate digital architecture of a system 1100 such as described with respect to FIG. 9A and FIG. 9B. Generally, both video data and control and diagnostic data are provided. Video data is held in both a frame buffer and a standby buffer that is used when failure of the frame buffer is detected. A pulse width modulation module is used to convert image data from either the frame buffer or standby frame buffer into data usable by an LED driver module that actively controls light intensity of individual or groups of LED pixels in the array. Control and diagnosis of the system 1100 is provided using various startup controllers, fault protection modules, and testing modules. Control data can be externally provided in part, and both external control data and internally generated data can be stored in one or more registers.

The digital system can have four image interfaces, including a parallel interface to work with existing LVDS or FPDLink/OpenLDI serializers/deserializers ("SerDes"); a unidirectional 8-bit UART interface, that includes logic to expand to 10 bits using an 8-point programmable "gamma" curve; an I2S interface; and an SPI/Quad SPI interface if short distance serial communications is required to a local microcontroller.

The SerDes interface can use the various data inputs (e.g. including those available from ten data pins D0-D9), as well as Data Enable, Pixel Clock and VSYNC. A maximum pixel clock can be set to 58 megahertz (MHz). Pixel Data can be used when Data Enable is high. I2C programmed "HBLANK" and "VBLANK" can be used to allow for interfacing with traditional composite video interfaces.

The UART interface allows a controller to transmit simplex data over LVDS up to 20 Mbps. Data format is 8 bits, no parity, single start and stop bits. Image transmission is started after a "break" (low for 12 periods), followed by an idle pulse (high for 1 period) and a sync sequence.

The I2S Interface allows the use of the I2S block in existing HD video processors to communicate image data to the CMOS. A clock Word Select and Serial Data pins can be used, as well as VSYNC. A WS pin can be used to stop toggling when the last word of the video frame is received. In operation, the device starts to receive pixel data when it detects the first WS switch after the VSYNC pulse.

A single SPI or Quad SPI interface can be used. SPI is the default mode for the SPI/QSPI interface and uses Chip Select, Serial Clock, MOSI and MISO. VSYNC input is also required. Quad SPI adds the QIO2 and QIO3 pins. Maximum clock frequency is 20 MHz.

In one embodiment, access to the control registers can be provide by a half duplex UART interface and an I2C interface. Each of these systems can be used to receive operational information useful for control, testing, and diagnosis of the system In operation, all received image frames will be loaded into a frame buffer and held until a frame-level CRC is completed. If the CRC passes, the frame gets clocked into the output buffer ("Sorted Frame Buffer 0 or 1") and will be displayed. If the CRC fails, a counter will be incremented. If the total number of consecutive CRC errors exceeds a preset value, the standby buffer will be clocked into the output buffer for display. The standby buffer has to be loaded on device initialization. All frame buffers are loaded with "0" on startup (display off).

More particularly, in one embodiment the CMOS backplane incorporates two frame buffers each sized 82*284.cells, with 10 bits per cell. The frame buffer is refreshed continuously and displayed under normal conditions. The standby buffer is loaded on initialization with a default image that will be projected in the case of communication failure. The following algorithm will be used to determine communication failure:

A counter "CRCError" is reset to 0 upon device initialization.

Each CRC frame error will cause the counter to increase by 1.

Each CRC frame pass will cause the counter to decrease by 1 until it is back to 0.

If the value of the "CRCError" counter reaches a maximum preset value, the device will automatically swap to the standby frame.

The maximum allowable number of "CRCError"s can be defined by loading this value over I2C in a register during initialization.

CRC is frame-wise and both CRC16 and CRC32 are supported. CRC will only be computed/checked on pixel data, not on blanking intervals or synchronization pulses.

CRC16 polynomial: 0x1021=x16+x12+x5+1

CRC32 polynomial: 0x04C11DB7=x32+x26+x23+x22+x16+x12+x11+x8+x7+x5+x4+x2+x+1

Figure 12A:
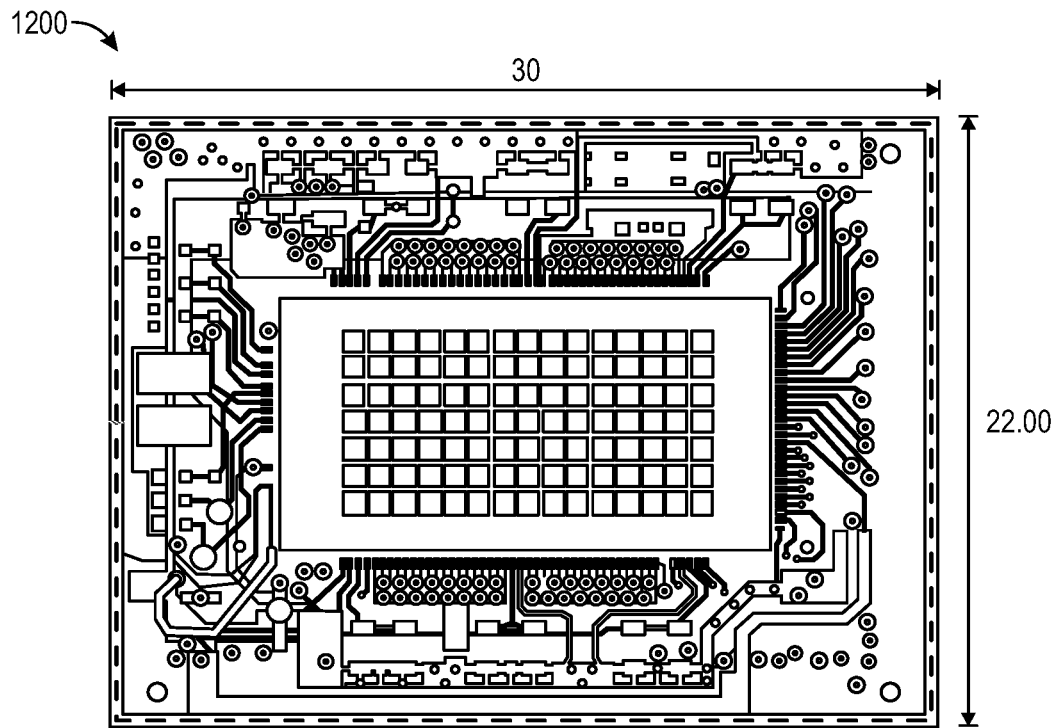
FIG. 12A illustrates a first representative PCB layer.
Figure 12B:
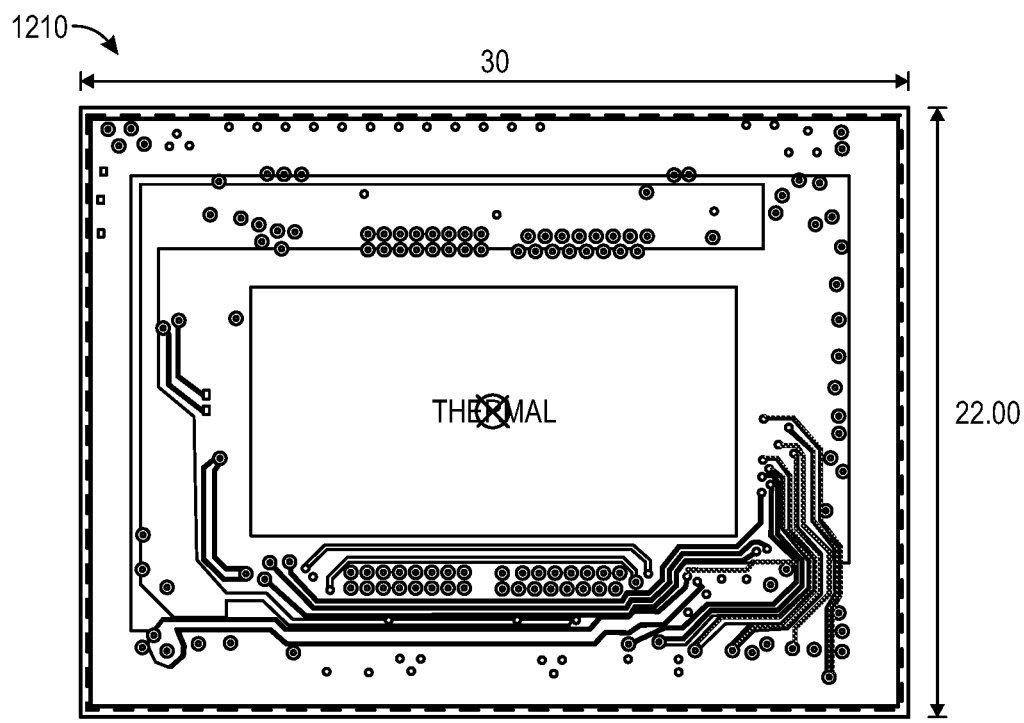
FIG. 12B illustrates a second representative PCB layer.
Figure 12C:
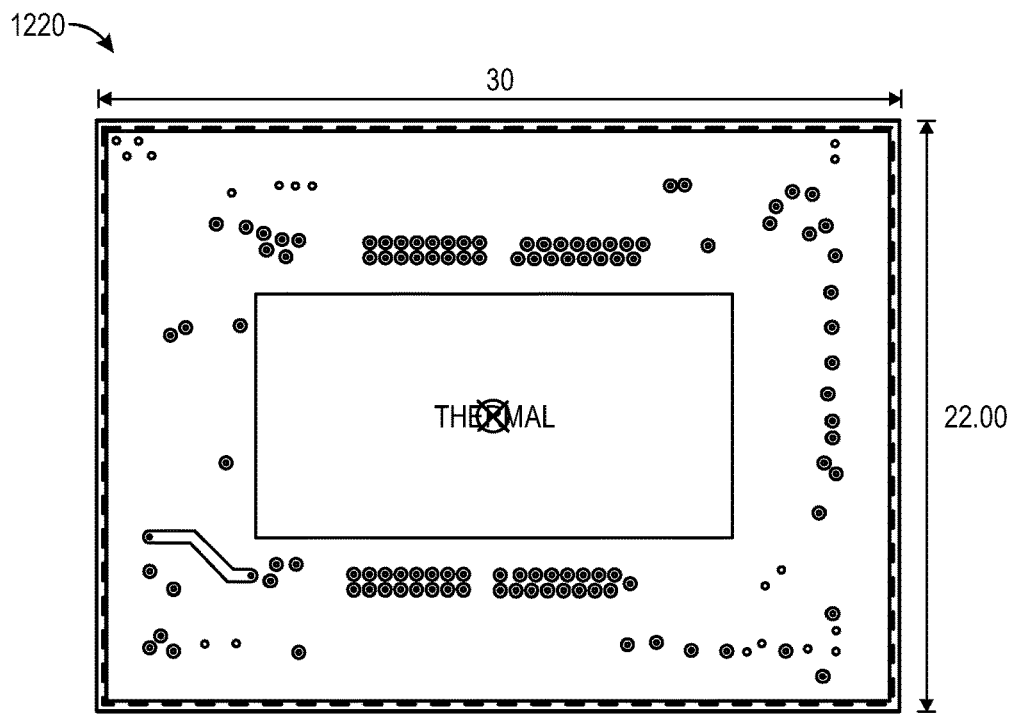
FIG. 12C illustrates a third representative PCB layer.
Figure 12D:
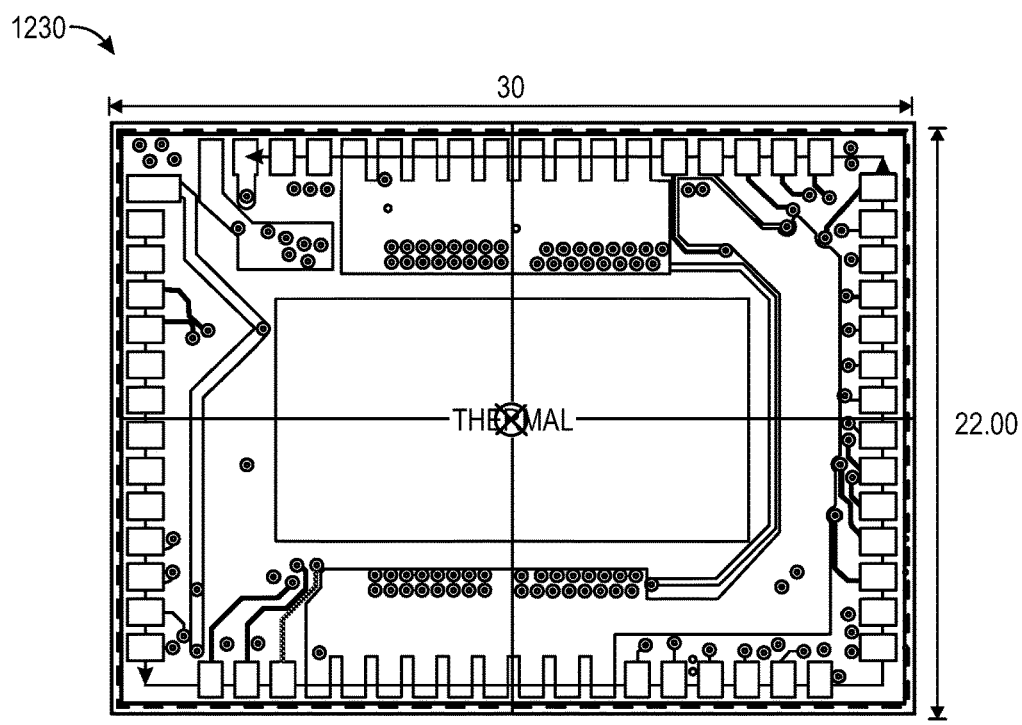
FIG. 12D illustrates a fourth representative PCB layer.

FIG. 12A-D illustrate representative PCB layers. As seen in FIGS. 11A-D, a multilayer PC board 1200 allows for a centrally positioned CMOS logic die and LED pixel array. Since the LED pixel array and CMOS logic die can require high current levels of between 10 to 20 amps (e.g. 17 amps), PC board 1200 layout can provide short power traces and connections, and further provide positioning that encourages heat transfer. In one embodiment, power transfer is mostly provided by via connected outer PC board layers (i.e. top and bottom PC board layers). FIG. 12A illustrates an outer top PC board layer 1200, while FIG. 12D illustrates an outer bottom PC board layer 1230 with an LGA pin-out. Signal routing is primarily provided by an inner second PC board layer 1210 (FIG. 12B) that further supports a thermal pad for heat removal. A digital ground plane is supported by an inner third PC board layer 1220 (FIG. 12C) that also supports a thermal pad for heat removal.

Figure 13A:
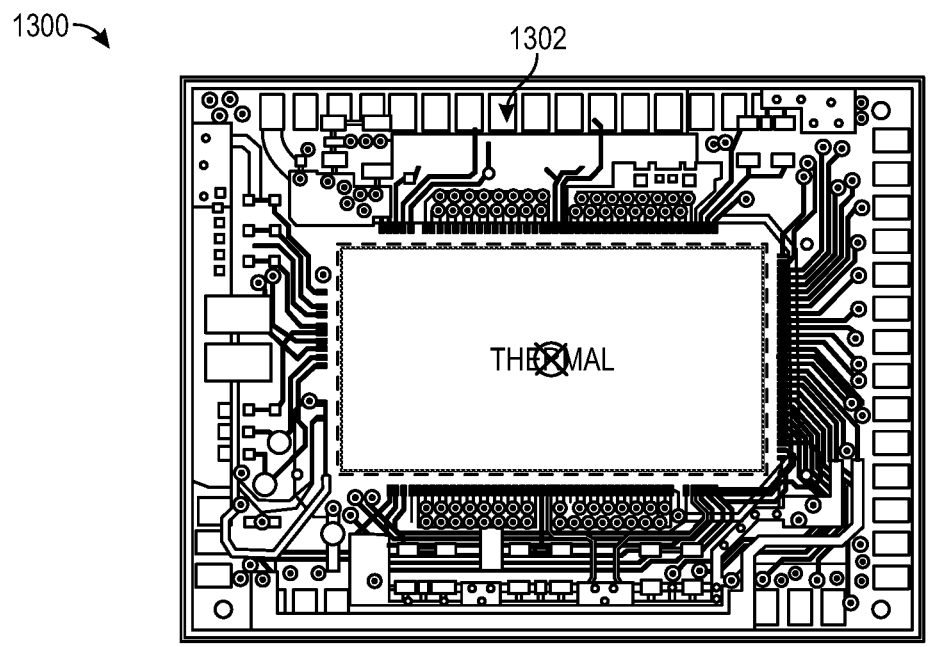
FIG. 13A illustrates a first representative routing layout.
Figure 13B:
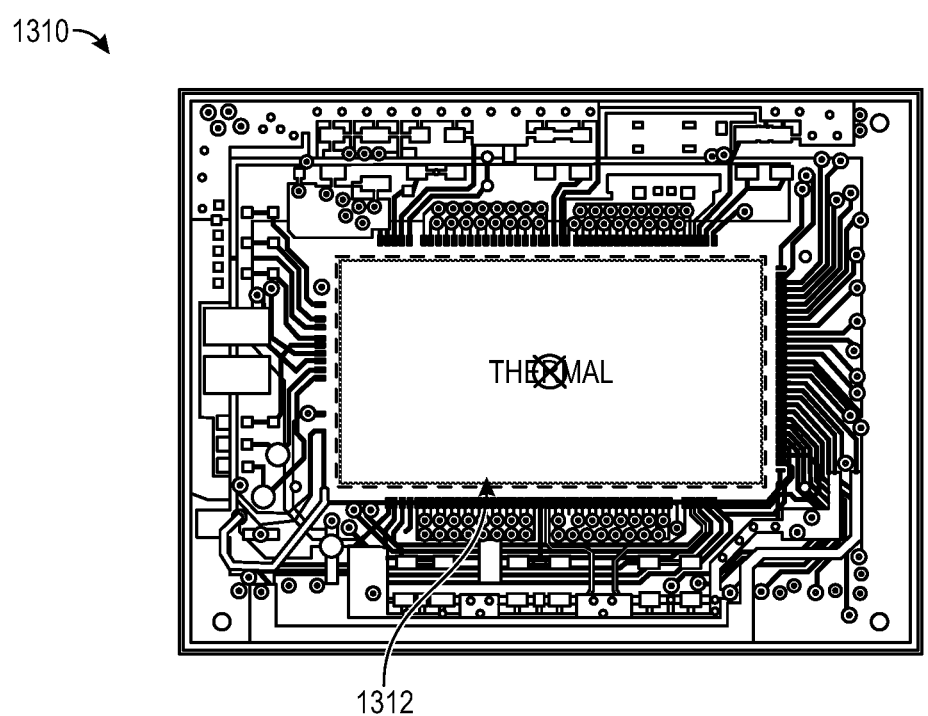
FIG. 13B illustrates a second representative routing layout.
Figure 13C:
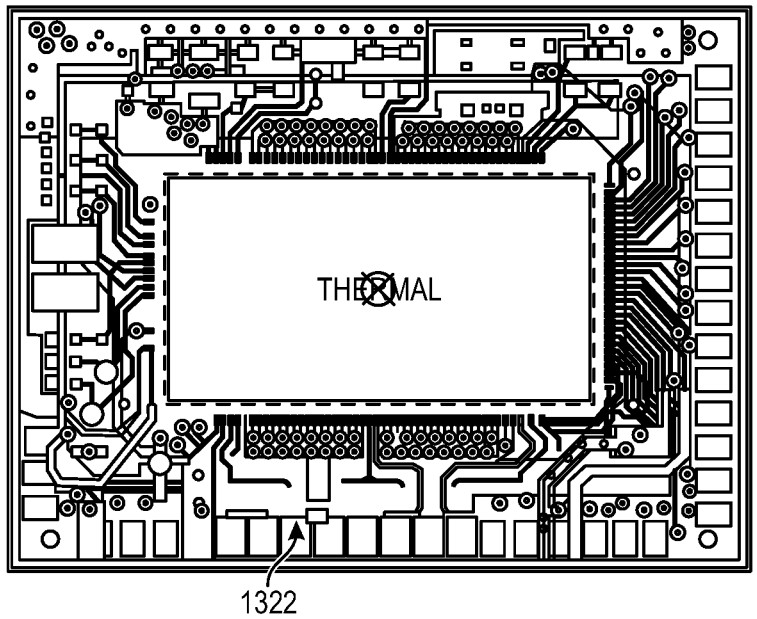
FIG. 13C illustrates a third representative routing layout.
Figure 13D:
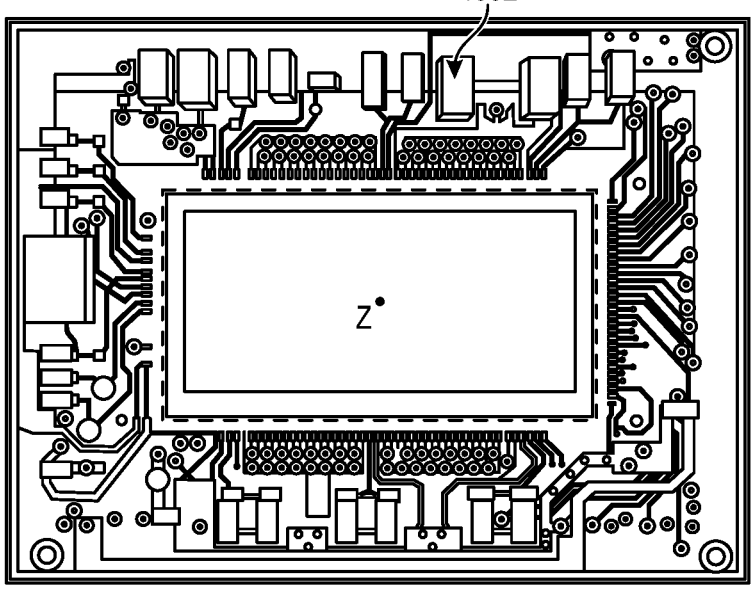
FIG. 13D illustrates a fourth representative routing layout.

FIG. 13A-D illustrate various representative routing layouts for a board such as discussed with respect to FIGS. 11A-D. As seen in FIGS. 12A and 12C, respective light colored regions 1302 and 1322 illustrate current routing for the outer top PC board layer 1300, while FIG. 13C illustrates current routing for an outer bottom PC board layer 1320 with an LGA pin-out. Pad design can be aligned and correspond to pads on CMOS to minimize routing problems, and the outer top PC board layer 1300 current carrying traces can be connected to the bottom PC board layer 1320 with through vias. 12B illustrates a separated analog ground trace for an inner second PC board layer 1310 that generally provides signal routing. A digital ground plane can be provided by an inner third PC board layer (not shown). The board may include a thermal pad 912 for heat removal. In one embodiment, passive elements 1332 can be arranged around the outer top PC board layer 1330 as seen in FIG. 13D.

Figure 14:
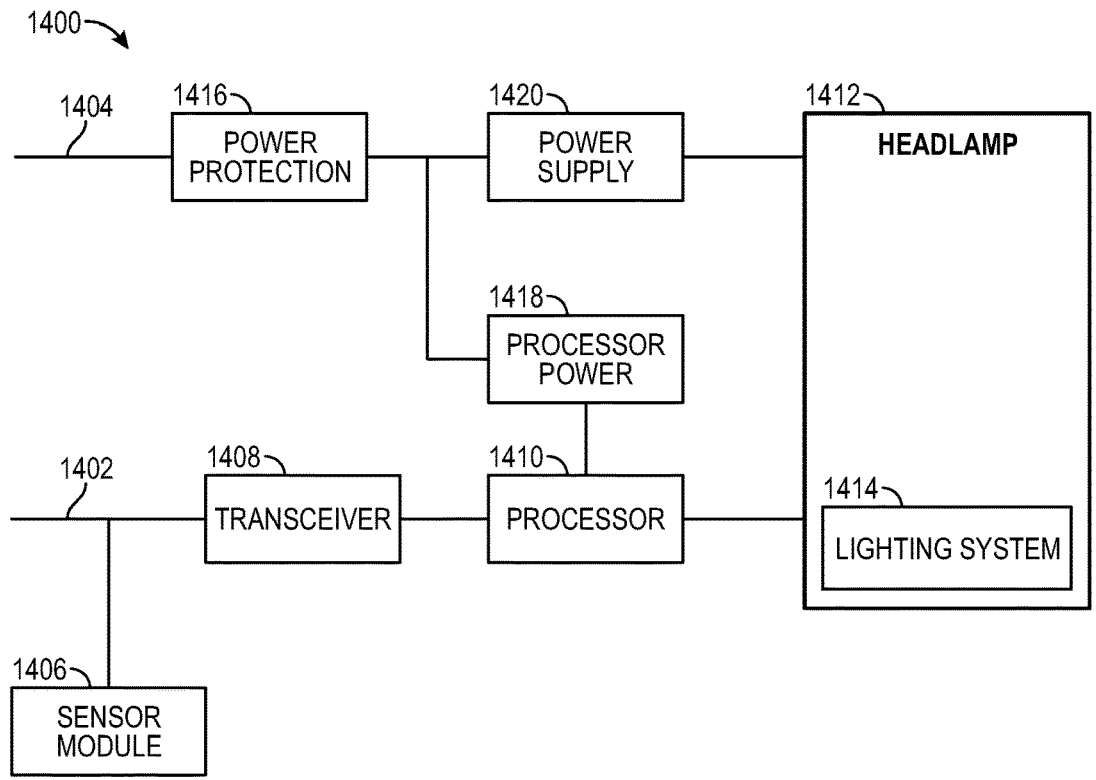
FIG. 14 illustrates an example system, according to various embodiments.

FIG. 14 illustrates an example system 1400, according to various embodiments. In some embodiments, the system 1400 may comprise a portion of a vehicle headlamp system in some embodiments. For example, the system 1400 may comprise an active headlamp system in some embodiments, where an intensity of light and/or image of the light output by the system 1400 may be changed. The system 1400, or portions thereof, may reside in a vehicle, in a headlamp of a vehicle, or some combination thereof. The system 1400 may implement a pixelated configuration made possible by an array of LEDs.

The system 1400 may be coupled to a bus 1402 of the vehicle and a power source 1404. The power source 1404 may provide power for the system 1400. The bus 1402 may be coupled to one or more components that can provide data and/or utilize data provided to the system 1400. The data provided on the bus 1402 may be related to environment conditions around the vehicle (such as a time of day, whether there is rain, whether there is fog, ambient light levels, and other environmental data), conditions of the vehicle (such as whether the vehicle is parked, whether the vehicle is in-motion, a current speed of the vehicle, a current direction of travel of the vehicle), and/or presence/positions of other vehicles or pedestrians around the vehicle. The system 1400 may provide feedback (such as information regarding operation of the system) to the components.

The system 1400 may further comprise a sensor module 1406. In some embodiments, the sensor module 1406 may include one or more sensors that can sense surroundings of the vehicle. For example, the one or more sensors may sense surroundings that can affect an image to be produced by light emitted by the system 1400. In some embodiments, the sensors may sense environmental conditions around the vehicle, and/or presence/positions of other vehicles or pedestrians around the vehicle. The sensor module 1406 may operate in combination with the data provided on the bus 1402 or may operate in lieu of a portion of the data (such as the environment conditions, and/or the presence/positions of the other vehicles or pedestrians) being provided on the bus 1402. The sensor module 1406 may output data indicating what has been sensed by the sensors.

The system 1400 may further include a transceiver 1408. The transceiver 1408 may have a universal asynchronous receiver-transmitter (UART) interface or a serial peripheral interface (SPI) in some embodiments. The transceiver 1408 may be coupled to the bus 1402 and the sensor module 1406, and may receive data from the bus 1402 and the sensor module 1406. In some embodiments, the transceiver 1408 may multiplex the data received from the bus 1402 and the sensor module 1406, and may direct feedback to the bus 1402 or the sensor module 1406.

The system 1400 may further include a processor 1410. The processor 1410 may be coupled to the transceiver 1408 and exchange data with the transceiver 1408. For example, the processor 1410 may receive data from the transceiver 1408 that was provided by the bus 1402 and/or the sensor module 1406. The processor 1410 may generate image data that indicates an image to be produced by light emitted from the system 1400. The image data generated by the processor 1410 may comprise the image data provided to the CMOS backplane 100 (FIG. 1) and/or other image described throughout this disclosure. The processor 1410 may further generate one or more inquiries that request information from one or more of the components of the system. The processor 1410 may further provide the feedback to the transceiver 1408 to be directed to the bus 1402 or the sensor module 1406.

The system 1400 may further include a headlamp 1412 of the vehicle. The headlamp 1412 may comprise an active headlamp in some embodiments, where the active headlamp may produce multiple different outputs of light. The headlamp 1412 may include a lighting system 1414. The lighting system 1414 may include a CMOS backplane with a light emitting pixel array, such as the CMOS backplane 100 with the light emitting pixel array 102 (FIG. 1). The headlamp 1412 may be coupled to the processor 1410 and may exchange data with the processor 1410. In particular, the lighting system 1414 may be coupled to the processor 1410 and may exchange data with the processor 1410. The lighting system 1414 may receive the image data and inquiries from processor 1410 and may provide feedback to the processor 1410.

The system 1400 may further include power protection 1416. The power protection 1416 may be coupled to the power source 1404 and may receive power from the power source. The power protection 1416 may include one or more filters that may reduce conducted emissions and provide power immunity. In some embodiments, the power protection 1416 may provide electrostatic discharge (ESD) protection, load-dump protection, alternator field decay protection, reverse polarity protection, or some combination thereof.

The system 1400 may further include processor power 1418. The processor power 1418 may be coupled to the power protection 1416 and may receive power from the power source 1404. The processor power 1418 may comprise a low dropout (LDO) regulator that may generate a power for powering the processor 1410 from the power provided by the power source 1404. The processor power 1418 may further be coupled to the processor 1410 and may provide power to the processor 1410.

The system 1400 may further comprise a power supply 1420. The power supply 1420 may be coupled to the power protection 1416 and may receive power from the power source 1404. In some embodiments, the power supply 1420 may comprise a converter that converts the power from the power source 1404 to power for the headlamp 1412. For example, the power supply 1420 may comprise a direct current (DC)-to-DC converter that converts the power from the power supply 1420 from a first voltage to a second voltage for the lighting system 1414 of the headlamp 1412.

Figure 15:
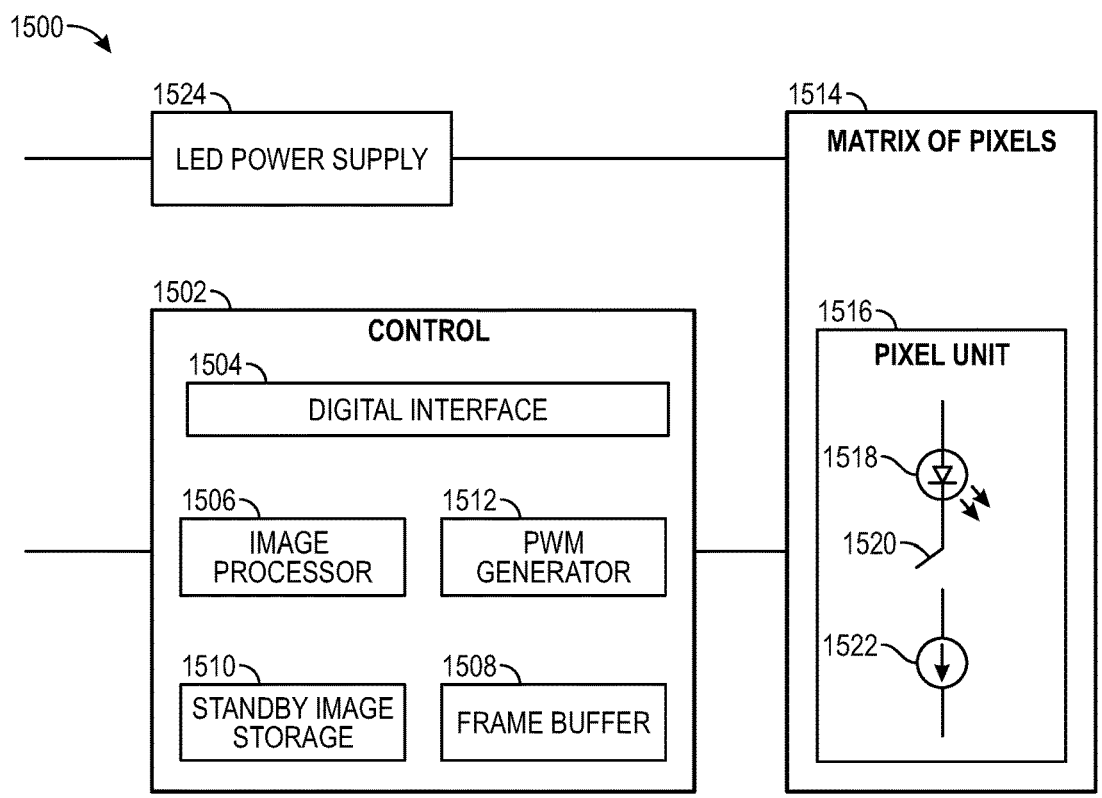
FIG. 15 illustrates an example lighting system, according to various embodiments.

FIG. 15 illustrates an example lighting system 1500, according to various embodiments. For example, the lighting system 1414 (FIG. 14) may include one or more of the features of the lighting system 1500. The lighting system 1500 may be implemented in a headlamp, such as the headlamp 1412 (FIG. 14).

The lighting system 1500 may include a control 1502. The control 1502 may include comprise the CMOS backplane 100 (FIG. 1). The control 1502 may be coupled to a processor of system (such as the processor 1410 (FIG. 14)). The control 1502 may receive image data and inquiries from the processor. The control 1502 may further provide feedback to the processor.

The control 1502 may include a digital interface 1504. The digital interface 1504 may facilitate communication with the processor and other components within the lighting system 1500. For example, the digital interface 1504 may comprise an SPI interface in some embodiments, where the SPI interface may facilitate communication. In some embodiments, the digital interface 1504 may comprise the interfaces of the CMOS backplane 100 along with the multiplexer 118 (FIG. 1). In particular, the digital interface 1504 may include the UART interface 110 (FIG. 1), the SPI 112 (FIG. 1), the I²C interface 114 (FIG. 1), the parallel interface 116 (FIG. 1), the 8-bit to 10-bit conversion circuitry 120 (FIG. 1), and the multiplexer 118 arranged as shown in FIG. 1. Further, the digital interface 1504 may include the UART interface 138 (FIG. 1) and the I²C interface 140 (FIG. 1).

The control 1502 may further include an image processor 1506. The image processor 1506 may include the CRC circuitry 122 (FIG. 1) and/or other elements within the CMOS backplane 100 that process image data. The image processor 1506 may receive the image data via the digital interface 1504 and may process the image data to produce indications of PWM duty cycles and/or intensities of light for causing the light system 1500 to produce the images indicated by the image data. The image processor 1506 may further determine turn on times in accordance with the approaches described herein and provide indications of the turn on times.

The control 1502 may further include a frame buffer 1508 and a standby image storage 1510. The frame buffer 1508 may comprise the frame buffer 126 (FIG. 1). Further, the standby image storage 1510 may comprise the standby frame buffer 124 (FIG. 1). The frame buffer 1508 may receive the indications produced by the image processor 1506 and store the indications for implementation. The standby image storage 1510 may further store indications of PWM duty cycles, intensities of light, and/or turn on times. The indications stored in the standby image storage 1510 may be implemented in the absence of indications stored in the frame buffer 1508. For example, the frame buffer 1508 may retrieve the indications from the standby image storage 1510 when the frame buffer 1508 is empty.

The control 1502 may further include a PWM generator 1512. The PWM generator 1512 may comprise the PWM generator circuitry 132 (FIG. 1). In some embodiments, the PWM generator 1512 may further include the display buffer 130 (FIG. 1). The PWM generator 1512 may receive the indications from the frame buffer 1508 and may produce PWM signals in accordance with the indications. The PWM generator 1512 may further determine intensities of light based on the indications and produce a signal to cause the intensities of light to be produced.

The lighting system 1500 may include a μLED array 1514. The μLED array 1514 may include a plurality of pixels, where each of the pixels include a pixel unit 1516. The μLED array 1514 may comprise the light emitting pixel array 102 (FIG. 1). In particular, the pixel unit 1516 may include an LED 1518, a PWM switch 1520, and a current source 1522. The pixel unit 1516 may receive the signals from the PWM generator 1512. The PWM signal from the PWM generator 1512 may cause the PWM switch 1520 to open and close in accordance with the value of the PWM signal. The signal corresponding to the intensities of light may cause the current source 1522 produce a current flow to cause the LED 1518 to produce the corresponding intensities of light. In some embodiment, the pixel unit 1216 may include one or more of the features of the pixel driver 200 (FIG. 2).

The lighting system 1500 may further include an LED power supply 1524. The LED power supply 1524 may be coupled to the power supply 1420 (FIG. 14) and may receive power from the power supply 1420. The LED power supply 1524 may produce power for the LEDs of the μLED array 1514. The LED power supply 1524 may be coupled to the μLED array 1514 and may provide the power for the LEDs to the μLED array 1514.

Figure 16:
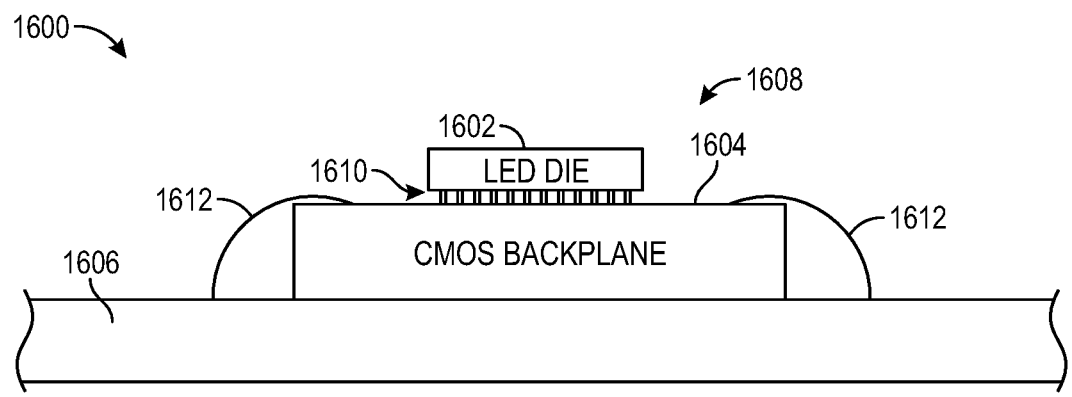
FIG. 16 illustrates an example hardware arrangement for implementing the system of FIG. 14, according to various embodiments.

FIG. 16 illustrates an example hardware arrangement 1600 for implementing the system 1400 of FIG. 14, according to various embodiments. In particular, the hardware arrangement 1600 may illustrate hardware components that may implement the system 1400.

The hardware arrangement 1600 may include an integrated LED 1608. The integrated LED 1608 may include an LED die 1602 and a complementary metal oxide semiconductor (CMOS) backplane 1604. The LED die 1602 may be coupled to the CMOS backplane 1604 by one or more interconnects 1610, where the interconnects 1610 may provide for transmission of signals between the LED die 1602 and the CMOS backplane 1604. The interconnects 1610 may comprise one or more solder bump joints, one or more copper pillar bump joints, or some combination thereof.

The LED die 1602 may include circuitry to implement the μLED array 1514 (FIG. 15). In particular, the LED die 1602 may include a plurality of pixels of the μLED array 1514. The LED die 1602 may include a shared active layer and a shared substrate for the μLED array 1514, thereby having the μLED array 1514 be a monolithic μLED array. Each pixel of the μLED array 1514 may include an individual segmented active layer and/or substrate. Accordingly, the LED die 1602 may be a monolithic die that has a segmented surface with a corresponding pixel of the μLED array 1514 occupying each segment of the surface. In some embodiments, the LED die 1602 may further include the PWM switches and the current sources of the μLED array 1514. In other embodiments, the PWM switches and the current sources may be included in the CMOS backplane 1604.

The CMOS backplane 1604 may include circuitry to implement the local control 1502 (FIG. 15) and the LED power supply 1524 (FIG. 15). The CMOS backplane 1604 may utilize the interconnects 1610 to provide the μLED array 1514 with the PWM signals and the signals for the intensity for causing the μLED array 1514 to produce light in accordance with the PWM signals and the intensity.

The hardware arrangement 1600 may further include a board 1606. The board 1606 may include circuitry to implement the power protection 1416 (FIG. 14), the power supply 1420 (FIG. 14), the processor power 1418 (FIG. 14), the sensor module 1406 (FIG. 14), the transceiver 1408 (FIG. 14), the processor 1410 (FIG. 14), or portions thereof. In other embodiments, the board 1606 may not include one or more of the power protection 1416, the power supply 1420 (FIG. 14), the processor power 1418, the sensor module 1406, the transceiver 1408, and the processor 1410, but may include one or more conductive elements (such as traces, vias, conductive layers, or other electrically conductive elements) that may be utilized for transmission of data between CMOS backplane 1604 and one or more of the power protection 1416, the power supply 1420, the processor power 1418, the sensor module 1406, the transceiver 1408, and the processor 1410. The board 1606 may be coupled to the CMOS backplane 1604. For example, the board 1606 may be coupled to the CMOS backplane 1604 via one or more wirebonds 1612 in the illustrated embodiment. The board 1606 and the CMOS backplane 1604 may exchange image data, power, and/or feedback via the coupling, among other signals.

Figure 17:
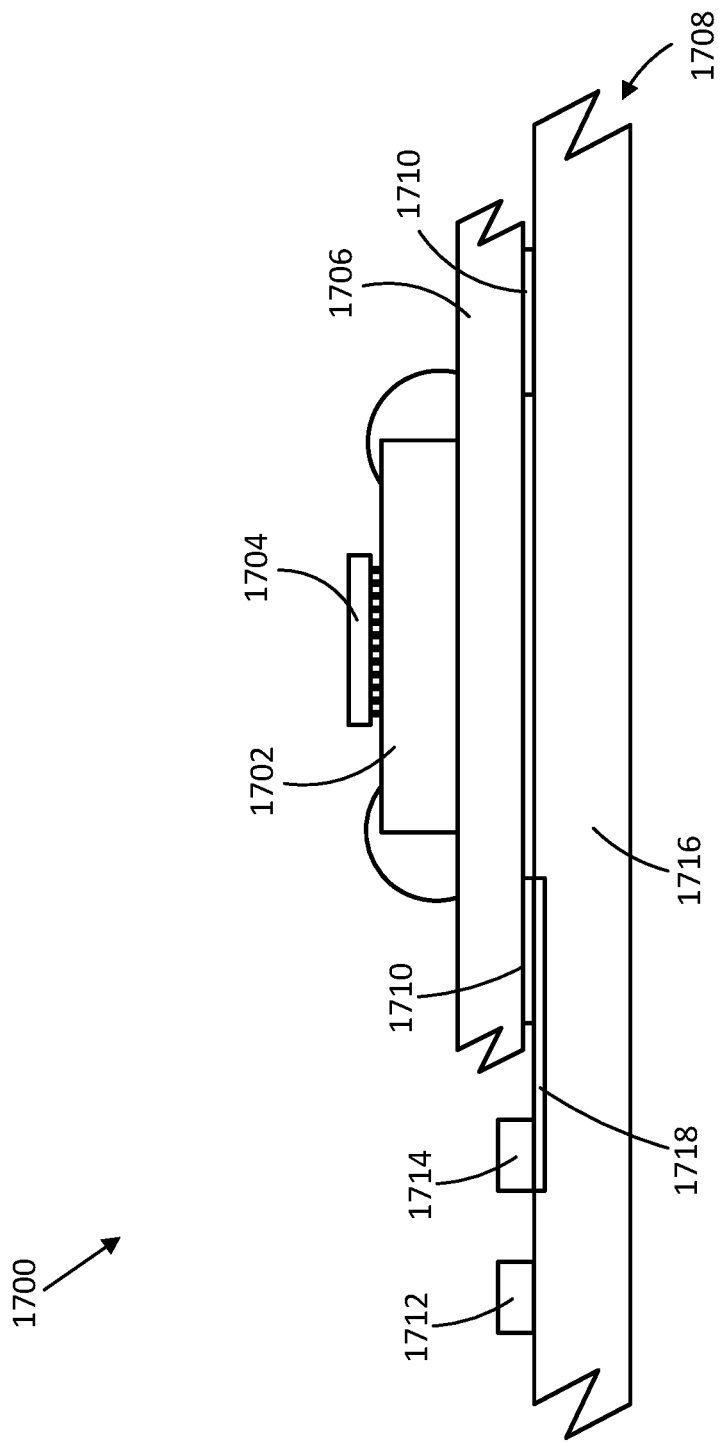
FIG. 17 illustrates another example hardware arrangement 1700, according to various embodiments.

FIG. 17 illustrates another example hardware arrangement 1700, according to various embodiments. The hardware arrangement 1700 may include a hardware arrangement for implementing a lighting system (such as the hardware arrangement 1600 (FIG. 16)), which may be referred to as a lighting assembly. For example, the hardware arrangement 1700 may include a CMOS backplane 1702 with an attached LED die 1704, and a board 1706 to which the CMOS backplane 1702 is coupled. The CMOS backplane 1702 may include one or more of the features of the CMOS backplane CMOS backplane 1604 (FIG. 16), the LED die 1704 may include one or more of the features of the LED die 1602 (FIG. 16), and the board 1706 may include one or more of the features of the board 1606 (FIG. 16).

The hardware arrangement 1700 may further include a board 1708, which may be referred to as a driver board. The board 1708 may include a substrate 1716 and one or more conductive elements, such as the conductive element 1718, that extend through the substrate and conduct communications and/or data. The conductive elements may comprise traces, vias, conductive layers, or other electrically conductive elements. The board 1708 may be utilized for coupling the hardware arrangement for implementing the lighting system within a system. For example, the board 1708 may be utilized for coupling the hardware arrangement for implementing the lighting system within a lamp (such as a headlamp) of a vehicle. The board 1708 may facilitate communication between the CMOS backplane 1702 and other systems within the vehicle when implemented within the lamp of the vehicle. In particular, the board 1708 may include one or more conductive elements (such as traces, vias, conductive layers, or other electrically conductive elements) to provide for transmission of communications and/or data among the CMOS backplane 1702, the board 1708, and/or a system in which the hardware arrangement 1700 is implemented.

The board 1708 may be coupled via one or more pads 1710 to the board 1706. In other embodiments, the board 1708 may be coupled via one or more other conductive elements to board 1706. The pads 1710 may provide for transmission of communications and/or data between the board 1708 and the board 1706. The communications and/or data may further be provided to the CMOS backplane 1702. The communications and/or data transmitted may include image data that may be provided to the CMOS backplane 1702 via an interface of the CMOS backplane 1702, such as the UART interface 110 (FIG. 1), the SPI 112 (FIG. 1), I²S interface 114 (FIG. 1), and/or a parallel interface 116 (FIG. 1). In some embodiments, the board 1708 may include an image data element 1712, where the image data element 1712 may provide image data to the CMOS backplane 1702 via an interface of the CMOS backplane 1702. The image data element 1712 may generate the image data, or may receive the image data from another element and store the image data for transmission to the CMOS backplane 1702. In other embodiments, the image data element 1712 may be omitted from the board 1708, and the board 1708 may receive the image data from another element where conductive elements of the board 1708 may provide for transmission of the image data through the board 1708 to the CMOS backplane 1702. The image data may define an image to be produced by a light emitting pixel array (such as the light emitting pixel array 102 (FIG. 1)), and may be stored in a frame buffer (such as the standby frame buffer 124 (FIG. 1) and/or the frame buffer 126 (FIG. 1)) of the CMOS backplane 1702 until provided to the light emitting pixel array.

In some embodiments, the image data may be provided to a UART interface (such as the UART interface 110) of the CMOS backplane 1702. In these embodiments, the image data may comprise 8-bit image data. Conversion circuitry (such as the 8-bit to 10-bit conversion circuitry 120 (FIG. 1)) of the CMOS backplane may receive the 8-bit image data and may convert the 8-bit image data into 10-bit image data. The board 1708 may include a UART element 1714 that is coupled to the UART interface of the CMOS backplane 1702. The conversion circuitry may be coupled to the UART interface of the CMOS backplane 1702 and convert the image data received by the UART interface. A baud rate of the UART element 1714 and the UART interface may be equal to or less than a conversion rate of the conversion circuitry, such that the conversion circuitry may convert the image data at a rate greater or equal to a rate at which the UART element 1714 provides the image data. The 8-bit image data may include an address header, where the address header may include a single bit in some embodiments. In some embodiments, the UART element 1714 may further be coupled to a second UART interface (such as the UART interface 138 (FIG. 1)), where a bus between the UART element 1714 and the two UART interfaces may be shared. The single bit within the address header may facilitate the shared bus with the two UART interfaces. In some other embodiments, the board 1708 may further include a second UART element, where the UART element 1714 couples with the first UART interface of the CMOS backplane 1702 and the second UART element couples with the second UART interface of the CMOS backplane 1702, and the UART elements and the UART interfaces share the same bus. In other embodiments, the UART element 1714 and/or the second UART element may be omitted from the board 1708, and the board may receive the 8-bit image data from a separate element and allow the 8-bit image data to be transmitted through the board 1708 to the CMOS backplane 1702.

Figure 18:
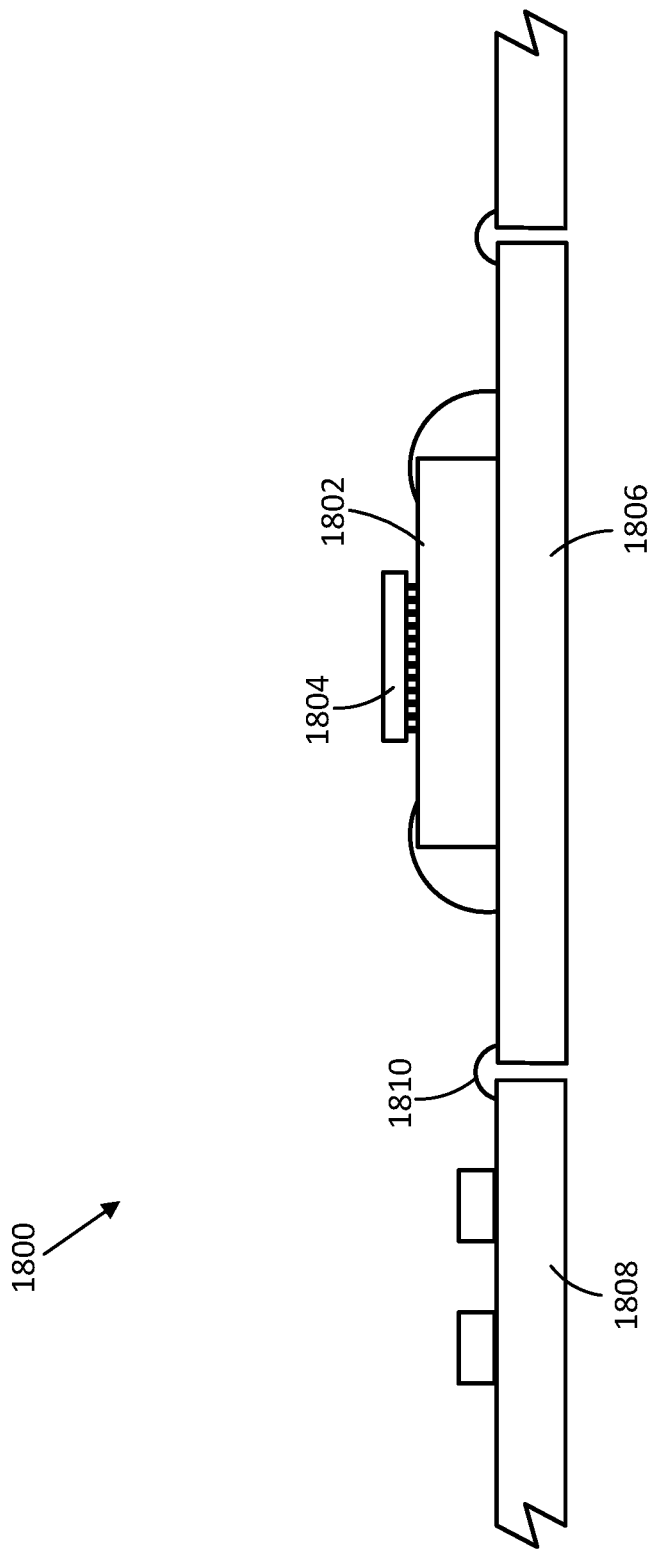
FIG. 18 illustrates another example hardware arrangement 1800, according to various embodiments.

FIG. 18 illustrates another example hardware arrangement 1800, according to various embodiments. The hardware arrangement 1800 may include one or more of the features of the hardware arrangement 1700 (FIG. 17). In particular, the hardware arrangement 1800 may include a CMOS backplane 1802 with an LED die 1804 coupled to the CMOS backplane 1802, where the CMOS backplane 1802 may be coupled to a board 1806. The CMOS backplane 1802 may include one or more of the features of the CMOS backplane 1702 (FIG. 17), the LED die 1804 may include one or more of the features of the LED die 1704 (FIG. 17), and the board 1806 may include one or more of the features of the board 1706 (FIG. 17). The hardware arrangement 1800 may further include a board 1808, which may be referred to as a driver board. The board 1808 may include one or more of the features of the board 1708. In the illustrated embodiment, the board 1808 may encircle the board 1806, and the board 1808 may be coupled to the board 1806 via wirebonds 1810. In other embodiments, the board 1808 may be located along any of the sides of the board 1806 and may be coupled to the board 1806 via one or more conductive elements for mounting the board 1806 to the board 1808.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

EXAMPLES

The following examples are provided by way of illustration.

Example 1 may include a light emitting diode (LED) controller for an LED pixel array, comprising an interface to an external data bus, a connection to a dynamic power supply for providing power to an LED pixel array, an image frame buffer connected to the interface to receive image data and provide it to the LED pixel array, a command and control module connected to the serial interface and configured to modify image frame buffer output signals, and a calibration data storage module connected to the command and control module to store calibration data related to pixel voltage response in the LED pixel array and enable modification of voltage provided by the dynamic power supply to the LED pixel array at least in part based on the image presented by the LED pixel array.

Example 2 may include the LED controller for an LED pixel array of example 1, further comprising a standby image buffer connected to the image frame buffer to hold a default image.

Example 3 may include the LED controller for an LED pixel array of example 1, further comprising a pulse width modulator connected between the image frame buffer and the LED pixel array.

Example 4 may include the LED controller for an LED pixel array of example 1, wherein the image frame buffer can refresh held images at 60 Hz or greater speed.

Example 5 may include the LED controller for an LED pixel array of example 1, wherein the command and control module is connected to an ADC that receives temperature data.

Example 6 may include the LED controller for an LED pixel array of example 1, wherein the command and control module is connected to an ADC that receives Vf data.

Example 7 may include the LED controller for an LED pixel array of example 1, wherein the command and control module is connected to an DAC that receives Vbias data.

Example 8 may include the LED controller for an LED pixel array of example 1, wherein the command and control module is connected to a second interface providing external control signals.

Example 9 may include the LED controller for an LED pixel array of example 1, wherein the command and control module includes a bypass line connected to the LED pixel array to allow individual pixel addressing.

Example 10 may include the LED controller for an LED pixel array of example 1, wherein images in the image buffer can be partially refreshed.

Example 11 may include the LED controller for an LED pixel array of example 1, wherein images in the image buffer can be differentially refreshed.

Example 12 may include the LED controller for an LED pixel array of example 1, wherein images in the image buffer can be modified by the command and control module.

Example 13 may include the LED controller for an LED pixel array of example 1, wherein the LED pixel array is a segmented pixel array.

Example 14 may include the LED controller for an LED pixel array of example 1, wherein the LED pixel array is a microLED pixel array.

Example 15 may include a PC board for an LED controller and LED pixel array, comprising a top PC board layer providing connection to a CMOS controller and LED pixel array, with the top PC board layer having a connection to a dynamic power supply for providing power to an LED pixel array, a bottom PC board layer connected through vias to the top PC board layer and the dynamic power supply, and at least one inner PC board layer arranged to carry signals.

Example 16 may include the PC board for an LED controller and LED pixel array of example 15, further comprising an inner PC board having a digital ground plane.

Example 17 may include the PC board for an LED controller and LED pixel array of example 15, further comprising an inner PC board having a separate analog ground.

Example 18 may include a light emitting diode (LED) controller for an LED pixel array, comprising an interface to receive image data for an image to be produced by the LED pixel array, a data storage module for storing calibration data related to the LED pixel array, and a control module coupled to the interface and the data storage module, the control module to receive the calibration data from the data storage module and modify the image data based on the calibration data.

Example 19 may include the LED controller of example 18, wherein to modify the image data includes to modify a signal of the image data or to modify a power of the image data.

Example 20 may include the LED controller of example 18, wherein to modify the image data includes to modify a power of the image data via pulse width modulation or power gating.

Example 21 may include the LED controller of example 18, further comprising an image frame buffer coupled to the interface, the image frame buffer to store the image data received from the interface, wherein the control module is to modify the image data at an output of the image frame buffer.

Example 22 may include the LED controller of example 18, wherein the control module includes a digital to analog converter (DAC), the DAC to be utilized to set a bias voltage for an active matrix of the LED pixel array.

Example 23 may include the LED controller of example 18, wherein the control module includes an analog to digital converter (ADC), the ADC to be utilized to determine a maximum forward voltage for the LED pixel array.

Example 24 may include the LED controller of example 18, wherein the control module includes an analog to digital converter (ADC), the ADC to be utilized to determine a temperature of a system that includes the LED controller.

Example 25 may include the LED controller of example 18, further comprising an oscillator coupled between the control module and an active matrix for the LED pixel array, the oscillator to set a pulse width modulation oscillation frequency for the active matrix.

Example 26 may include the LED controller of example 25, wherein the oscillator is to globally set the pulse width modulation oscillation frequency for the active matrix.

Example 27 may include the LED controller of example 18, wherein the control module is coupled to an active matrix of the LED pixel array via a bypass line, and wherein the bypass line is to be utilized to address individual pixels or pixel blocks of the active matrix.

Example 28 may include the LED controller of example 18, further comprising a dummy pixel driver coupled to the control module and an active matrix of the LED pixel array, the dummy pixel driver to be utilized to address individual pixels or pixel blocks of the active matrix.

Example 29 may include the LED controller of example 18, wherein the calibration data includes pixel voltage response data for the LED pixel array.

Example 30 may include the LED controller of example 18, further comprising a connection to be connected to a dynamic power supply, the dynamic power supply to provide power to the LED pixel array, wherein the LED controller can modify a voltage provided by the dynamic power supply based on modification of the image data.

Example 31 may include the LED controller of example 18, further comprising a standby image buffer to store default image data for a default image to be produced by the LED pixel array, wherein the control module is coupled to the standby image buffer and the control module is to modify the default image data based on the calibration data.

Example 32 may include the LED controller of example 18, wherein the interface is a first interface, wherein the LED controller includes a second interface coupled to the control module, wherein the control module is to receive external control signals via the second interface, and wherein the external control signals are to provide for external control of the control module.

Example 33 may include a control for a light emitting pixel array, comprising a frame buffer to store image data, the image data to be utilized to drive pixels of the light emitting pixel array, a universal asynchronous receiver/transmitter (UART) interface coupled to the frame buffer, the UART interface to receive the image data from an external element, and conversion circuitry coupled to the UART interface, wherein the conversion circuitry is to receive the image data in a first bit length from the UART interface and translate the image data into a second bit length to be provided to the frame buffer.

Example 34 may include the control of example 33, wherein the conversion circuitry is to utilize a piece-wise linear interpolation curve to translate the image data from the first bit length to the second bit length.

Example 35 may include the control of example 33, wherein the first bit length is 8 bits, and wherein the second bit length is 10 bits.

Example 36 may include the control of example 33, further comprising a multiplexer coupled between the UART interface and the frame buffer, the multiplexer to select an interface from a plurality of interfaces to be coupled to the frame buffer to provide the image data to the frame buffer, wherein the plurality of interfaces includes the UART interface.

Example 37 may include the control of example 36, further comprising cyclic redundancy check (CRC) circuitry coupled between the multiplexer and the frame buffer, the CRC circuitry to perform a CRC on the image data output by the multiplexer.

Example 38 may include the control of example 33, further comprising a standby frame buffer to store default image data, wherein the standby frame buffer and the frame buffer are coupled in parallel between the UART interface and a multiplexer, and wherein the multiplexer is to select which of the frame buffer or the standby frame buffer is to be coupled to the light emitting pixel array.

Example 39 may include the control of example 38, further comprising a display buffer to be coupled between the multiplexer and the light emitting pixel array, wherein the display buffer is to store an output of the multiplexer, the output to be utilized to drive the pixels of the light emitting pixel array.

Example 40 may include a lighting system, comprising a light emitting pixel array having a plurality of pixels to emit light, and a control coupled to the light emitting pixel array, the control including a universal asynchronous receiver/transmitter (UART) interface to receive image data, the image data to be utilized to drive the pixels of the light emitting pixel array, and conversion circuitry coupled to the UART interface, wherein the image data received by the UART interface has a first bit length, and wherein the conversion circuitry is to translate the image data from the first bit length to a second bit length.

Example 41 may include the lighting system of example 40, wherein the conversion circuitry is to utilize a piece-wise linear interpolation curve to translate the image data from the first bit length to the second bit length.

Example 42 may include the lighting system of example 40, wherein the first bit length is 8 bits, and wherein the second bit length is 10 bits.

Example 43 may include the lighting system of example 40, wherein the control further includes a pixel driver having a switch coupled between a light emitting diode (LED) of the light emitting pixel array and a current source for powering the LED, and a bidirectional switch coupled between the switch and the LED, wherein the bidirectional switch is to inject a small current into the LED for characterization or test purposes.

Example 44 may include the lighting system of example 43, wherein the bidirectional switch is further to be utilized for monitoring a forward voltage of the LED.

Example 45 may include the lighting system of example 40, wherein the control further includes a pixel driver having a field effect transistor (FET) to be coupled between a light emitting diode (LED) of the light emitting pixel array and a current source for powering the LED, and an operational amplifier with an output of the operational amplifier coupled to a gate of the FET, wherein a first input of the operational amplifier is to receive a reference voltage and a second input of the operational amplifier is coupled to the current source, wherein the operational amplifier is to set a maximum current to be provided to the LED.

Example 46 may include the lighting system of example 40, wherein the control further includes a pixel driver to drive a light emitting diode (LED) of the light emitting pixel array, and a fault detection circuit to be selectively coupled between the pixel driver and the LED, wherein the fault detection circuit is to determine whether there is a fault in the pixel driver or the LED.

Example 47 may include the lighting system of example 46, wherein the fault detection circuit includes a first comparator to compare an open threshold voltage with a forward voltage of the LED to determine whether the LED is open or the pixel driver is shorted, and a second comparator to compare a short threshold voltage with the forward voltage of the LED to determine whether the LED is shorted or the pixel driver is open.

Example 48 may include the lighting system of example 46, wherein the LED is a first LED and the pixel driver is a first pixel driver, wherein the control further includes a second pixel driver to drive a second LED of the light emitting pixel array, wherein the fault detection circuit is to be selectively coupled between the second pixel driver and the second LED, and wherein the fault detection circuit is determine whether there is a fault in the second pixel driver or the second LED.

Example 49 may include the lighting system of example 40, wherein the control further includes over temperature protection (OTP) circuitry coupled to one or more temperature sensors of the light emitting pixel array, and wherein the OTP circuitry is to determine whether a temperature of the light emitting pixel array exceeds a threshold temperature.

Example 50 may include a hardware arrangement for a lighting system, comprising a light emitting diode (LED) die having a light emitting pixel array, a board to couple the hardware arrangement to an external system, and a complementary metal oxide semiconductor (CMOS) backplane coupled to the LED die and the board, the CMOS backplane to provide image data to the LED die to cause the light emitting pixel array to present an image, wherein the CMOS backplane includes a universal asynchronous receiver/transmitter (UART) interface coupled to the board, the UART to receive the image data from the board, and conversion circuitry coupled to the UART interface, wherein the conversion circuitry is to receive the image data in a first bit length from the UART interface and translate the image data into a second bit length to be utilized for driving LEDs of the light emitting pixel array.

Example 51 may include the hardware arrangement of example 50, wherein the conversion circuitry is to utilize a piece-wise linear interpolation curve to translate the image data from the first bit length to the second bit length.

Example 52 may include the hardware arrangement of example 50, wherein the first bit length is 8 bits, and wherein the second bit length is 10 bits.

Example 53 may include a driver board to couple to a lighting assembly, comprising a substrate, and one or more conductive elements extending through the substrate and to couple to the lighting assembly, the one or more conductive elements to conduct image data to the lighting assembly for transmission to a universal asynchronous receiver/transmitter (UART) interface of the lighting assembly, the image data to comprise 8 bits of image data, and the lighting assembly is to translate the 8 bits of image data to 10 bits of image data.

Example 54 may include the driver board of example 53, wherein the image data is further to comprise an address header, the address header having a single bit.

Example 55 may include the driver board of example 53, wherein a baud rate of the UART interface is equal to or less than a conversion rate of conversion circuitry to convert the 8 bits of image data to the 10 bits of image data.

Example 56 may include the driver board of example 53, wherein a piece-wise linear interpolation curve is to be utilized to translate the 8 bits of image data to the 10 bits of image data.

Example 57 may include the driver board of example 53, wherein the UART interface of the lighting assembly is a first UART interface, wherein the one or more conductive elements are to conduct data for transmission to a second UART interface of the lighting assembly, the first UART interface and the second UART interface to share a bus.

The invention claimed is:

1. A control for a light emitting pixel array, comprising:
a frame buffer to store image data, the image data to be utilized to drive pixels of the light emitting pixel array;
a universal asynchronous receiver/transmitter (UART) interface coupled to the frame buffer, the UART interface to receive the image data from an external element; and
conversion circuitry coupled to the UART interface, the conversion circuitry to receive the image data in a first bit length from the UART interface and translate, using a piece-wise linear interpolation curve, the image data into a second bit length to be provided to the frame buffer, the first bit length less than the second bit length.

2. The control of claim 1, wherein the first bit length is 8 bits, and wherein the second bit length is 10 bits.

3. The control of claim 1, further comprising a multiplexer coupled between the UART interface and the frame buffer, the multiplexer to select an interface from a plurality of interfaces to be coupled to the frame buffer to provide the image data to the frame buffer, wherein the plurality of interfaces includes the UART interface.

4. The control of claim 1, further comprising a standby frame buffer to store default image data, wherein the standby frame buffer and the frame buffer are coupled in parallel between the UART interface and a second multiplexer, and wherein the second multiplexer is to select which of the frame buffer or the standby frame buffer is to be coupled to the light emitting pixel array.

5. The control of claim 4, further comprising a display buffer to be coupled between the multiplexer and the light emitting pixel array, wherein the display buffer is to store an output of the multiplexer, the output to be utilized to drive the pixels of the light emitting pixel array.

6. The control of claim 3, further comprising cyclic redundancy check (CRC) circuitry coupled between the multiplexer and the frame buffer, the CRC circuitry to perform a CRC on the image data output by the multiplexer.

7. A lighting system, comprising:
a light emitting pixel array having a plurality of pixels to emit light; and
a control coupled to the light emitting pixel array, the control including:
a universal asynchronous receiver/transmitter (UART) interface to receive image data, the image data to be utilized to drive the pixels of the light emitting pixel array; and
conversion circuitry coupled to the UART interface, wherein the image data to be received by the UART interface has a first bit length, and wherein the conversion circuitry is to translate, using a piece-wise linear interpolation curve, the image data from the first bit length to a second bit length, the first bit length less than the second bit length.

8. The lighting system of claim 7, wherein the first bit length is 8 bits, and wherein the second bit length is 10 bits.

9. The lighting system of claim 7, wherein the control further includes a pixel driver having:
a switch coupled between a light emitting diode (LED) of the light emitting pixel array and a current source for powering the LED; and
a bidirectional switch coupled between the switch and the LED, wherein the bidirectional switch is to inject a small current into the LED for characterization or test purposes.

10. The lighting system of claim 9, wherein the bidirectional switch is further to be utilized for monitoring a forward voltage of the LED.

11. The lighting system of claim 7, wherein the control further includes a pixel driver having:
a field effect transistor (FET) to be coupled between a light emitting diode (LED) of the light emitting pixel array and a current source for powering the LED; and
an operational amplifier with an output of the operational amplifier coupled to a gate of the FET, a first input of the operational amplifier to receive a reference voltage and a second input of the operational amplifier is coupled to the current source, the operational amplifier to set a maximum current to be provided to the LED.

12. The lighting system of claim 7, wherein the control further includes:
a pixel driver to drive a light emitting diode (LED) of the light emitting pixel array; and
a fault detection circuit to be selectively coupled between the pixel driver and the LED, the fault detection circuit to determine whether there is a fault in the pixel driver or the LED.

13. The lighting system of claim 12, wherein the fault detection circuit includes:
a first comparator to compare an open threshold voltage with a forward voltage of the LED to determine whether the LED is open or the pixel driver is shorted; and
a second comparator to compare a short threshold voltage with the forward voltage of the LED to determine whether the LED is shorted or the pixel driver is open.

14. The lighting system of claim 12, wherein the LED is a first LED and the pixel driver is a first pixel driver, wherein the control further includes a second pixel driver to drive a second LED of the light emitting pixel array, the fault detection circuit to be selectively coupled between the second pixel driver and the second LED, and the fault detection circuit to determine whether there is a fault in the second pixel driver or the second LED.

15. The lighting system of claim 7, wherein the control further includes over temperature protection (OTP) circuitry coupled to one or more temperature sensors of the light emitting pixel array, the OTP circuitry to determine whether a temperature of the light emitting pixel array exceeds a threshold temperature.

16. A hardware arrangement for a lighting system, comprising:
a light emitting diode (LED) die having a light emitting pixel array;
a board to couple the hardware arrangement to an external system; and
a complementary metal oxide semiconductor (CMOS) backplane coupled to the LED die and the board, the CMOS backplane to provide image data to the LED die to cause the light emitting pixel array to present an image, wherein the CMOS backplane includes:
a universal asynchronous receiver/transmitter (UART) interface coupled to the board, the UART to receive the image data from the board; and
conversion circuitry coupled to the UART interface, the conversion circuitry to receive the image data in a first bit length from the UART interface and translate, using a piece-wise linear interpolation curve, the image data into a second bit length to be utilized for driving LEDs of the light emitting pixel array, the first bit length less than the second bit length.

17. The hardware arrangement of claim 16, wherein the first bit length is 8 bits, and wherein the second bit length is 10 bits.

* * * * *